(12) United States Patent
Fuchie et al.

(10) Patent No.: US 8,270,744 B2
(45) Date of Patent: Sep. 18, 2012

(54) IMAGE PROCESSING APPARATUS AND IMAGE PROCESSING METHOD

(75) Inventors: Takaaki Fuchie, Kanagawa (JP); Kyohei Koyabu, Kanagawa (JP); Shojiro Shibata, Kanagawa (JP); Kashu Takahashi, Tokyo (JP); Yuya Horiuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 369 days.

(21) Appl. No.: 12/673,186

(22) PCT Filed: Jun. 23, 2009

(86) PCT No.: PCT/JP2009/061800
§ 371 (c)(1),
(2), (4) Date: Feb. 12, 2010

(87) PCT Pub. No.: WO2009/157577
PCT Pub. Date: Dec. 30, 2009

(65) Prior Publication Data
US 2011/0188769 A1  Aug. 4, 2011

(30) Foreign Application Priority Data

Jun. 27, 2008  (JP) .............. P2008-169391
Jun. 27, 2008  (JP) .............. P2008-169393

(51) Int. Cl.
*G06K 9/36* (2006.01)
*G06K 9/46* (2006.01)
*G06K 9/38* (2006.01)
*H04B 1/66* (2006.01)

(52) U.S. Cl. .............. 382/251; 382/232; 375/240.03

(58) Field of Classification Search ............... None
See application file for complete search history.

(56) References Cited

U.S. PATENT DOCUMENTS 5,073,820 A  12/1991 Nakagawa et al.
(Continued)

FOREIGN PATENT DOCUMENTS

CN  1195943  10/1998
(Continued)

OTHER PUBLICATIONS

Joint Final Committee Draft (JFCD) of Joint Video Specification (ITU-T Rec. H. 264 / ISO/IEC 14496-10 AVE) (JVT-D157), [online], ITU-T / ISO/IEC, Jul. 22, 2002, URL:http://wftp3.itu.int/av-arch/jvt-site/2002_07_Klagenfurt/JVT-D157.zip, p. i, 83-90.

(Continued)

*Primary Examiner* — Li Liu
(74) *Attorney, Agent, or Firm* — Frommer Lawrence & Haug LLP; William S. Frommer

(57) ABSTRACT

The present invention enables a reduction in circuit scale.
In an image coding apparatus (100), as for DCT coefficients as simple coded data obtained by coding an input image (91) by simple processing, the input image (91) is coded by at least quantizing the input image (91) as an input image on the basis of selected quantization parameters (QPl) discretely selected from quantization parameters (QP) as quantization factors, thereby computing generated code sizes of the input image (91) upon coding. The image coding apparatus (100) corrects an error in the generated code sizes of the input image upon coding which occurs in accordance with the simple processing, thereby computing low-precision generated code sizes. The image coding apparatus (100) computes low-precision generated code sizes when the input image (91) is coded on the basis of quantization parameters (QP) other than the selected quantization parameters (QPl), by an interpolation process with respect to the low-precision generated code sizes when the input image (91) is coded on the basis of the selected quantization parameters (QPl).

13 Claims, 9 Drawing Sheets

U.S. PATENT DOCUMENTS

| | | | |
|---|---|---|---|
| 5,245,427 A * | 9/1993 | Kunihiro | 348/400.1 |
| 5,604,494 A | 2/1997 | Murakami et al. | |
| 5,612,900 A | 3/1997 | Azadegan et al. | |
| 5,703,646 A | 12/1997 | Oda | |
| 5,721,589 A | 2/1998 | Murata | |
| 5,838,826 A * | 11/1998 | Enari et al. | 382/234 |
| 5,870,145 A * | 2/1999 | Yada et al. | 375/240.04 |
| 5,933,532 A | 8/1999 | Mihara | |
| 6,052,488 A | 4/2000 | Takahashi et al. | |
| 6,100,931 A | 8/2000 | Mihara | |
| 6,163,573 A | 12/2000 | Mihara | |
| 6,337,879 B1 | 1/2002 | Mihara et al. | |
| 6,493,384 B1 | 12/2002 | Mihara | |
| 6,678,322 B1 | 1/2004 | Mihara | |
| 6,934,330 B2 | 8/2005 | Sugiyama et al. | |
| 7,286,715 B2 | 10/2007 | Togashi et al. | |
| 7,313,184 B2 | 12/2007 | Mihara | |
| RE40,679 E | 3/2009 | Oda | |
| 7,885,471 B2 | 2/2011 | Segall | |
| 2003/0016878 A1 * | 1/2003 | Motosu et al. | 382/251 |
| 2005/0180505 A1 | 8/2005 | Ogawa et al. | |
| 2005/0259730 A1 | 11/2005 | Sun | |
| 2006/0062481 A1 | 3/2006 | Suvanto | |
| 2007/0201553 A1 * | 8/2007 | Shindo | 375/240.03 |
| 2008/0279275 A1 * | 11/2008 | Suzuki | 375/240.03 |
| 2009/0067738 A1 | 3/2009 | Fuchie et al. | |
| 2010/0098173 A1 | 4/2010 | Horiuchi et al. | |
| 2010/0118971 A1 * | 5/2010 | Tanida et al. | 375/240.23 |
| 2010/0135386 A1 * | 6/2010 | Shibata et al. | 375/240.03 |
| 2010/0266047 A1 | 10/2010 | Takahashi et al. | |
| 2011/0090960 A1 | 4/2011 | Leontaris et al. | |
| 2011/0103480 A1 | 5/2011 | Dane | |
| 2011/0188769 A1 | 8/2011 | Fuchie et al. | |
| 2011/0200266 A1 | 8/2011 | Fuchie et al. | |

FOREIGN PATENT DOCUMENTS

| | | |
|---|---|---|
| CN | 1241336 | 1/2000 |
| CN | 1642285 | 7/2005 |
| EP | 0 871 333 | 10/1998 |
| EP | 0 892 561 | 1/1999 |
| EP | 1 555 831 | 7/2005 |
| EP | 2 028 865 | 2/2009 |
| JP | 4 114585 | 4/1992 |
| JP | 4135427 | 5/1992 |
| JP | 6 350985 | 12/1994 |
| JP | 7 123273 | 5/1995 |
| JP | 7 322252 | 12/1995 |
| JP | 8 65677 | 3/1996 |
| JP | 8 115205 | 5/1996 |
| JP | 9-247675 | 9/1997 |
| JP | 10 23413 | 1/1998 |
| JP | 10 174098 | 6/1998 |
| JP | 10 341435 | 12/1998 |
| JP | 11 98502 | 4/1999 |
| JP | 2000 261805 | 9/2000 |
| JP | 2000 270323 | 9/2000 |
| JP | 3264043 | 12/2001 |
| JP | 3358620 | 10/2002 |
| JP | 2002 359853 | 12/2002 |
| JP | 2004 7475 | 1/2004 |
| JP | 2004 56680 | 2/2004 |
| JP | 3561962 | 6/2004 |
| JP | 2005 203905 | 7/2005 |
| JP | 2006 67302 | 3/2006 |
| JP | 2006 222555 | 8/2006 |
| JP | 2007 158430 | 6/2007 |
| KR | 10-0264710 | 9/2000 |
| KR | 10-2005-0074286 | 7/2005 |
| WO | WO 98/26602 | 6/1998 |
| WO | WO 99 07158 | 2/1999 |
| WO | WO 2008 065814 | 6/2008 |

OTHER PUBLICATIONS

Final Office Action issued on Dec. 9, 2011 in related U.S. Appl. No. 12/207,611.

Non-Final Office Action issued on Aug. 25, 2011 in related U.S. Appl. No. 12/207,611.

Viscito E. et al.: "A Video Compression Algorithm with Adaptive BitAllocation and Quantiintion", Visual Communication and Image Processing '91: Visual Communication. Boston, Nov, 11-13, 1991; [Proceedings of SPIE], Bellingham, SPIE, US, vol. 1605 Part 01/02, Nov. 11, 1991, pp. 58-72, XP000479218.

Office Action issued in corresponding Chinese patent application No. 200810212084.X on Feb. 24, 2010 and its English translation.

* cited by examiner

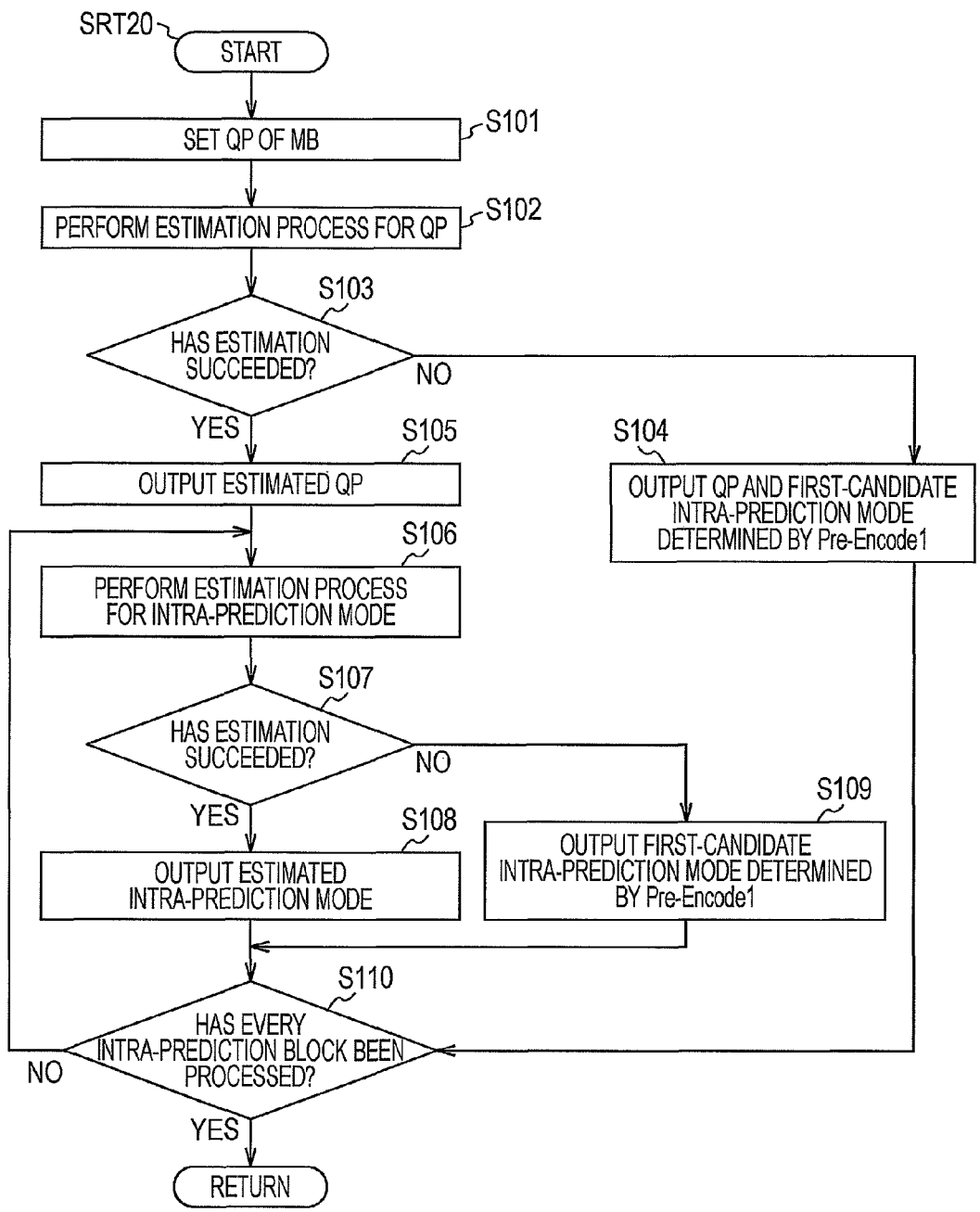

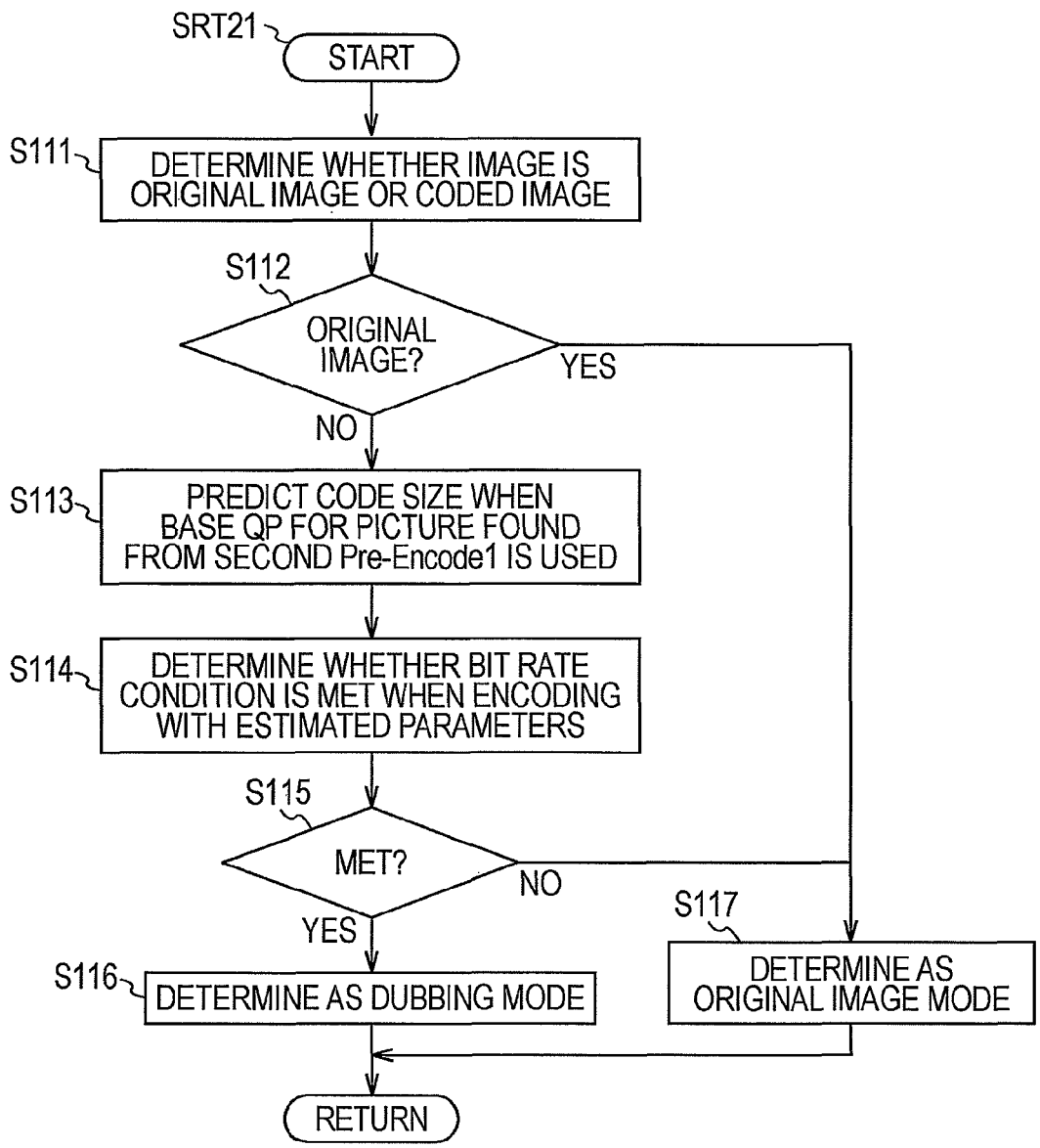

IMAGE PROCESSING APPARATUS AND IMAGE PROCESSING METHOD

TECHNICAL FIELD

The present invention concerns, for example, an image coding apparatus or the like, and relates to, in particular, a technical field of matching a generated code size to a target code size given to one picture without performing intra feed back control.

BACKGROUND ART

In the related art, in systems or the like for transmitting bit streams of moving images, or recording the bit streams onto recording media, high-efficiency coding is carried out to make efficient use of the transmission path or the recording capacity. In image coding apparatuses realizing this, the coding bit rate of a bit stream generated at the encoder is made constant in conformity with the transfer rate of the transmission medium, and the size of generated data, that is, the quantization step for quantization at the encoder is controlled under this constraint. That is, for example, if there is a succession of images with complex patterns, the quantization step is made larger to limit the size of generated data. Conversely, if there is a succession of simple patterns, the quantization step is made smaller to increase the size of generated data, thereby maintaining a fixed rate while preventing an overflow or underflow of the buffer memory from occurring.

Consequently, in image coding apparatuses according to the related art as mentioned above, the quantization step becomes large and image quality is degraded when there is a succession of complex images, and the quantization step becomes small when there is a succession of simple images, making it impossible to obtain a uniform image quality throughout. In view of this problem, for example, in Patent Document 1, an image coding apparatus is disclosed with which, in accordance with the ratio of the coding complexity of each GOP (Group of Pictures) to the total sum of the coding complexities of a plurality of GOPs, allocated code sizes allocated to individual GOPs themselves are calculated in such a way that large allocations are made to GOPs containing images with complex patterns, and small allocations are made to GOPs containing images with simple patterns.

On the other hand, for example, the step2 of TM5 (test model 5) is well known as a method for matching a generated code size to a target code size given to one picture. This is a technique with which a code size allocated to a picture is distributed uniformly over macro blocks (MBs) to find a target code size for each MB, and feed back control is applied within the picture to achieve a match to the target code size.
Patent Document 1: Japanese Patent No. 3358620

However, with the above-described method of the step2 of TM5, there are cases in which when encoding the first picture of a sequence or a picture immediately following a scene change, the initial value of quantization step does not match the pattern of that picture, resulting in degradation of image quality.

For example, if the quantization step is too large in a portion of the feed back control prior to following the pattern, the image quality of that portion is degraded compared with other portions. If the quantization step is too small, too much code size is used in that portion, which may even affect other portions.

In addition, since the target code size for each MB is set constant at all times, the code size distribution becomes inappropriate in cases such as when there is an unbalance in intra image complexity. Accordingly, it is desirable for the image coding apparatus to execute coding in parallel in advance to predict a generated code size, and match the generated code size to a target code size given to one picture, without performing intra feed back control. However, if the image coding apparatus is to execute quantization in parallel for the number of quantization parameters, the circuit scale becomes disadvantageously large.

DISCLOSURE OF INVENTION

To solve the above-mentioned problems, an image processing apparatus according to the present invention includes: a selected-generated-code-size computing section that codes an input image by at least quantizing simple coded data that is obtained by simple coding of the input image through simple processing, by using quantization steps based on selected quantization factors discretely selected from quantization factors, and computes generated code sizes of the input image upon coding; an error correcting section that corrects an error in the generated code sizes of the input image upon coding which occurs in accordance with the simple processing; and an interpolated-generated-code-size computing section that computes generated code sizes when the input image is coded on the basis of quantization parameters other than the selected quantization parameters, by an interpolation process with respect to the generated code sizes when the input image is coded on the basis of the selected quantization factors.

Consequently, the image processing apparatus does not need to code an input image on the basis of all quantization parameters, and also codes the input image by simple coding. Thus, it is possible to enhance the precision of the generated code size by correcting an error based on the simple coding, while simplifying the circuit configuration.

Further, an image processing method according to the present invention includes: a selected-generated-code-size computing step of coding an input image by at least quantizing simple coded data that is obtained by simple coding of the input image through simple processing, by using quantization steps based on selected quantization factors discretely selected from quantization factors, and computing generated code sizes of the input image upon coding; an error correcting step of correcting an error in the generated code sizes of the input image upon coding which occurs in accordance with the simple processing; and an interpolated-generated-code-size computing step of computing generated code sizes when the input image is coded on the basis of quantization parameters other than the selected quantization parameters, by an interpolation process with respect to the generated code sizes when the input image is coded on the basis of the selected quantization factors.

Consequently, the image processing method does not need to code an input image on the basis of all quantization parameters, and also codes the input image by simple coding. Thus, it is possible to enhance the precision of the generated code size by correcting an error based on the simple coding, while simplifying the circuit configuration.

Further, an image processing apparatus according to the present invention includes: a simple-generated-code-size computing section that computes generated code sizes of an input image upon simple coding, by performing simple coding on the input image by at least quantizing the input image on the basis of quantization factors; a base-quantization-factor determining section that determines, as a base quantization factor, a quantization factor with which a generated code size when coding the input image is predicted to be closest to a target code size, on the basis of the generated code sizes computed by the simple-generated-code-size computing section; a back search section that detects a quantization factor used in the previous coding of the input image, as a detection quantization factor for each of coding units, on the basis of remainders when dividing the input image by rescaling factors based on the quantization factors; a detection-generated-code-size computing section that computes a generated code size for each of the coding units, by coding the input image on the basis of the detection quantization factor detected by the back search section; and a control-unit generated-code-size computing section that computes a generated code size for each of control units each including a plurality of the coding units, by summing a generated code size based on the base quantization factor for each of the coding units for which the detection quantization factor has not been detected by the back search section, and the generated code size computed by the detection-generated-code-size computing section for each of the coding units for which the detection quantization factor has been detected by the back search section.

Consequently, for an input image that is a non-original image, the image processing apparatus uses a generated code size based on the base quantization factor with respect to each of coding units for which a detection quantization factor has not been detected by the back search section, thereby making it possible to compute a generated code size when coding the input image on the basis of the detection quantization factor detected by the back search section, by means of simple configuration.

According to the present invention, there is no need to code an input image on the basis of all quantization parameters, and also the input image is coded by simple coding. Thus, it is possible to enhance the precision of the generated code size by correcting an error based on the simple coding, while simplifying the circuit configuration. Thus, the present invention can realize an image processing apparatus and an image processing method that can reduce the circuit scale in computing a generated code size.

Further, according to the present invention, for an input image that is a non-original image, a generated code size based on the base quantization factor with respect to each of coding units for which a detection quantization factor has not been detected by the back search section are used, thereby making it possible to compute a generated code size when coding the input image on the basis of the detection quantization factor detected by the back search section, by means of simple configuration. Thus, the present invention can realize an image processing apparatus and an image processing method that can reduce the circuit scale in computing a generated code size.

BRIEF DESCRIPTION OF DRAWINGS

FIG. 8 is a flowchart illustrating a previous-parameter estimation process.

FIG. 9 is a flowchart illustrating determination of an original image mode or a dubbing mode.

BEST MODES FOR CARRYING OUT THE INVENTION

Figure 1:
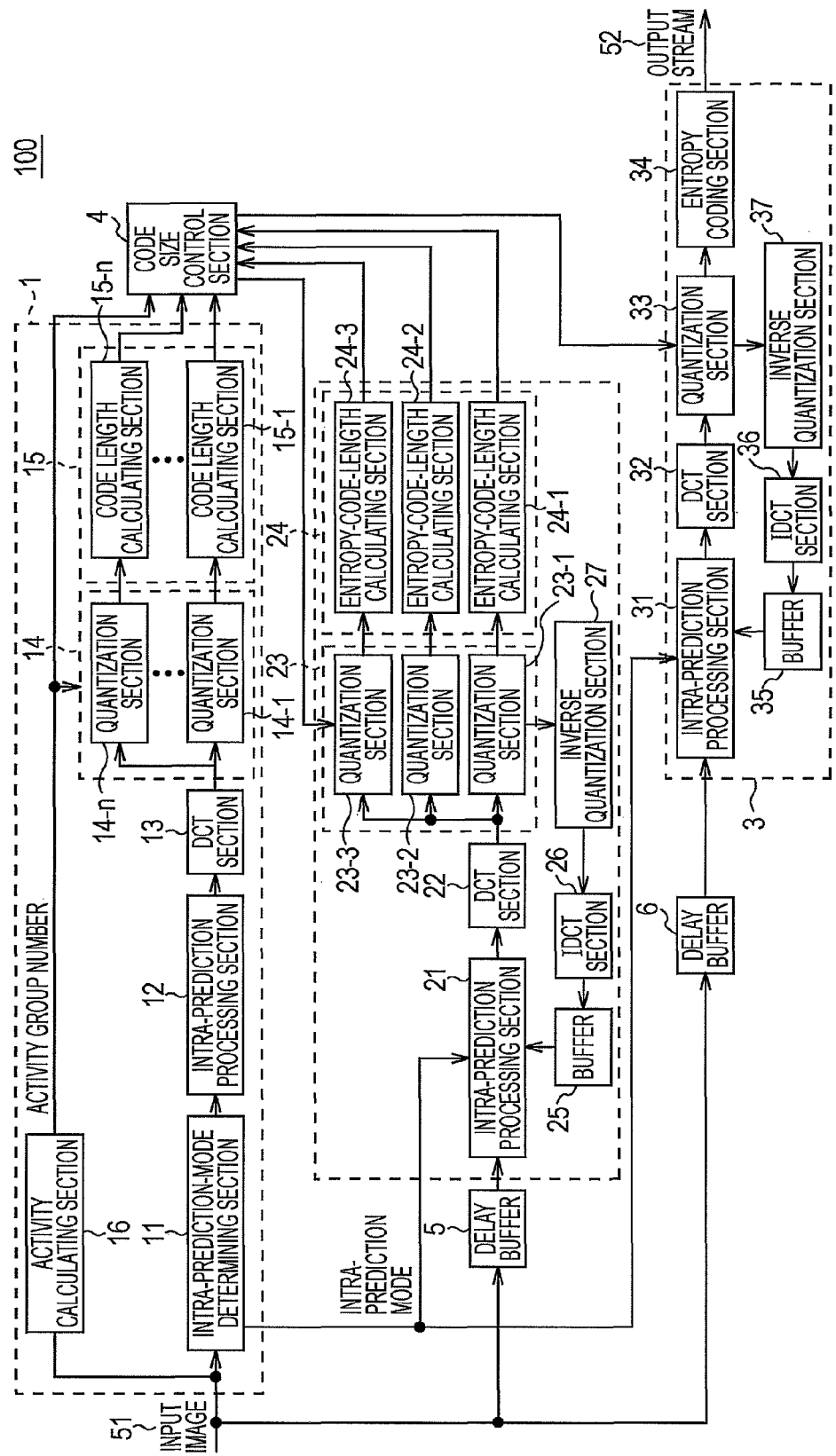
FIG. 1 is a configuration diagram of an image coding apparatus according to a first embodiment of the present invention.

Hereinbelow, with reference to the drawings, the best modes for carrying out the present invention (hereinafter, simply referred to as embodiments) will be described in detail. It should be noted that the description will proceed in the following order.

1. First Embodiment (prediction of low-precision generated code sizes by interpolation)
2. Second Embodiment (prediction of high-precision generated code sizes by back search)<

1. First Embodiment

[1-1. Features of Present Invention]

An image coding apparatus 100 and an image coding method according to this embodiment have such features as described below.

The image coding apparatus 100 is based on an image compression scheme using arithmetic coding represented by H.264/AVC (Advanced Video Coding; advanced moving image compression coding standard) or the like. When performing code size control, to realize a favorable code size distribution within a picture, the image coding apparatus 100 combines parallel pre-encoding (Pre Encode) and serial pre-encoding. Thus, the image coding apparatus 100 performs a prediction with good precision while limiting increases in circuit scale and Latency (delay time).

More specifically, in the image coding apparatus 100, by first and second pre-encoding sections 1 and 2, only the quantization and code length calculating sections are performed in parallel, and other processing elements are shared, thus achieving a reduction in circuit scale by the commonality of circuits.

That is, while it is normally necessary to provide all processing elements in parallel when performing parallel pre-encoding, in the image coding apparatus 100 according to this embodiment, processing elements that can be made common without affecting precision are accurately identified, and commonality of circuits is achieved with respect to the processing elements. This limits increases in circuit scale of the first and second pre-encoding sections 1 and 2 themselves and latency (delay time).

Then, in the first pre-encoding section 1, parallel pre-encoding with its precision reduced slightly for limiting the circuit scale and the processing load is performed over a wide range of quantization parameters (QP), thereby roughly estimating the quantization parameter QP for achieving a target code size. In the second pre-encoding section 2, parallel pre-encoding is performed over a narrow range with enhanced precision, thereby determining a base quantization parameter $QP_{MB}$ to be used in a main encoding section 3. In this way, the image coding apparatus 100 reduces the processing load while enhancing the precision of image coding. Further, since an error due to the simplification of pre-encoding has a correlation with the bit rate and the quantization parameter QP, statistical models as will be described later in detail are prepared in advance, and an error is corrected from the bit rate and the quantization parameter QP.

FIG. 1 shows and explains the configuration of the image coding apparatus 100 according to an embodiment of the present invention.

The image coding apparatus 100 has the first pre-encoding section 1, the second pre-encoding section 2, the main encoding section 3, a code size control section 4, and delay buffers 5 and 6.

The first pre-encoding section 1 is a module that performs first pre-encoding, and includes an intra-prediction-mode determining section 11, an intra-prediction processing section 12, a DCT (Discrete Cosine Transform) section 13, a quantization section 14, an entropy-code-length calculating section 15, and an activity calculating section 16.

The second pre-encoding section 2 is a module that performs second pre-encoding, and includes an intra-prediction processing section 21, a DCT section 22, a quantization section 23, an entropy-code-length calculating section 24, a buffer 25, an IDCT (Inverse DCT) section 26, and an inverse quantization section 27.

Further, the main encoding section 3 is a module that performs main encoding, and includes an intra-prediction processing section 31, a DCT section 32, a quantization section 33, an entropy coding section 34, a buffer 35, an IDCT section 36, and an inverse quantization section 37.

The code size control section 4 is a module that performs code size control.

[1-2. Prediction of Quantization Parameter and Quantization Matrix]

[1-2-1. Computation of Low-Precision Generated Code Sizes]

The image coding apparatus 100 adaptively selects and uses, for example, three quantization matrices Q Matrix in accordance with the coding complexity (detailed description will be given later). The image coding apparatus 100 sets one quantization matrix Q Matrix, and also roughly estimates generated code sizes with respect to a range of quantization parameters QP that can be taken by the quantization matrix Q Matrix being set, through simple processing by the first pre-encoding section 1. Hereinafter, the generated code sizes estimated as a result of the first pre-encoding section 1 will be referred to as low-precision generated code sizes. The image coding apparatus 100 executes the same processing with respect to all the quantization matrices Q Matrix, and computes low-precision generated code sizes when changing the quantization matrix Q Matrix and the quantization parameter QP. Then, the image coding apparatus 100 sets a quantization parameter QP and a quantization matrix Q Matrix with which the low-precision generated code size becomes closest to a target code size, as a predicted quantization parameter QPd, which is to be used as an average quantization parameter Base QP for a picture in the next step (the second pre-encoding section 2), and a quantization matrix Q Matrix for a picture which is to be used in the next step (hereinafter, this will be referred to as predicted quantization matrix Q MatrixD).

At this time, the image coding apparatus 100 computes low-precision generated code sizes of an input image 91 by using some discretely selected quantization parameters QP (hereinafter, these will be referred to as selected quantization parameters QPl). The image coding apparatus 100 computes low-precision generated code sizes between the selected quantization parameters QPl by interpolation, thereby computing low-precision generated code sizes with respect to all of the range of quantization parameters QP that can be taken by the quantization matrix Q Matrix.

In practice, the input image 91 is first inputted to the intra-prediction-mode determining section 11 of the first pre-encoding section 1. The intra-prediction-mode determining section 11 generates difference image data in all intra-prediction modes on the basis of the input image 91, and also determines an intra-prediction mode on the basis of the predictions of generated code sizes of the difference image data. The prediction mode (prediction direction) is to be determined from among nine prediction modes in minimum units of 4×4 pixels.

This determined intra-prediction mode is transmitted to the intra-prediction processing section 12, and is also transmitted to the second pre-encoding section 2 and the main encoding section 3. This intra-prediction mode is also used for the second encoding by the second pre-encoding section 2, and the main encoding by the main encoding section 3.

Next, the intra-prediction processing section 12 calculates the difference image between a predicted image and the input image 91, and generates difference image data. The predicted image at this time is created from the input image 91 in order to reduce processing. In this way, in the first pre-encoding section 1, an inverse quantization section, an IDCT section, and a buffer can be eliminated by performing an intra-prediction process by using an input image, thereby making it possible to reduce the circuit scale.

The DCT section 13 executes an integer-precision DCT process on the difference image data, generating DCT coefficients, and then transmits these to the quantization section 14. The quantization section 14 performs quantization on the DCT coefficients, generating quantized coefficients, and then transmits these to the entropy-code-length calculating section 15. The entropy-code-length calculating section 15 calculates code sizes by performing context-adaptive variable length coding (CAVLC) with respect to the quantized coefficients. According to CAVLC, a high-efficiency coding scheme can be adaptively selected in accordance with the surrounding conditions.

As described above, one of the features of the first pre-encoding is that CAVLC is used for code size calculation, even when CABAC (Context-Adaptive Binary Arithmetic Coding) is used as an entropy coding scheme in the main encoding. It should be noted that CABAC is context-adaptive binary arithmetic coding.

Here, the quantization section 14 includes quantization sections 14-1, . . . , 14-$n$ (n=1, 2, 3 . . . ) that are provided in parallel, and the entropy-code-length calculating section 15 includes entropy-code-length calculating sections 15-1, . . . , 15-$n$ (n=1, 2, 3 . . . ) that are provided in parallel. The value of n is set to, for example, 15. The quantization section 14 sets, in each of the quantization sections 14-1, . . . , 14-$n$ selected quantization parameters QPl corresponding to the quantization matrix Q Matrix being set, among quantization parameters QP between 0 and 51. The selected quantization parameters QPl are discretely selected at an arbitrary interval from a range of quantization parameters QP that can be taken by the quantization matrix Q Matrix. It should be noted that the selected quantization parameters QPl may be selected at a fixed interval, for example, or may be selected at an interval that varies with the value of the quantization parameter QP. Under this configuration, the first pre-encoding section 1 executes quantization and code length calculation in parallel with respect to a plurality of quantization parameters QP equal to the number of the parallel arrangements described above, and outputs respective generated code sizes to the code size control section 4.

That is, the first pre-encoding section 1 performs the first pre-encoding over a wide range of quantization parameters QP through parallel pre-encoding with limited circuit scale by the quantization section 14 and the entropy-code-length calculating section 15, thereby computing generated code sizes with respect to the wide range of quantization parameters QP.

Here, simultaneously in parallel with the determination of an intra-prediction mode by the intra-prediction mode determining section 11, the activity calculating section 16 calculates activity, and groups each macro block (MB) by activity. That is, for example, assuming a grouping into NumOfActivityGroup, the activity calculating section 16 compares the value of activity with ActivityTheshold[0] to ActivityTheshold[NumOfActivityGroup-2] to determine an activity group.

It should be noted that the quantization parameter QP actually used in the quantization process is found by adding an offset (AdaptQpDelta), which is dependent on the activity group, to the average quantization parameter QP (BaseQP) for a picture.

$$MB\_QP = BaseQp + AdaptQpDelta[activity\_group]$$

For example, if NumOfActivityGroup is 13, each value of AdaptQpDelta can be determined as:

$$AdaptQpDelta[13] = \{-6, -5, -4, -3, -2, -1, 0, 1, 2, 3, 4, 5, 6\}.$$

The activity group number determined with respect to each MB is inputted to the quantization section 14. The quantization section 14 adds an offset according to the activity group to each of the selected quantization parameters QPl to compute an adaptive quantization parameter QPt. The quantization section 14 executes a quantization process on the DCT coefficients on the basis of the adaptive quantization parameter QPt.

The first pre-encoding section 1 sets the next quantization matrix Q Matrix and selected quantization parameters QPl corresponding to the quantization matrix Q Matrix, thereby computing generated code sizes similarly. As a result, the first pre-encoding section 1 computes generated code sizes individually with respect to quantization matrices Q Matrix and selected quantization parameters QPl corresponding to the quantization matrices Q Matrix.

[1-2-2. Correction of Error in Generated Code Size]

The code size control section 4 performs correction with respect to the generated code sizes computed in the first pre-encoding section 1.

The correction here is performed by exploiting the fact that an error has some degree of tendency.

The first cause of error is the use of the input image 91 for the intra-prediction process, instead of a local decode image. In this case, since the image used for intra-prediction is free from distortion due to codec, the coding efficiency becomes better than in the actual encoding, and thus the obtained code size tends to be somewhat small. Since the magnitude of this error depends on the magnitude of distortion, the relationship between a generated code size and an error is such that the error tends to become larger as the bit rate becomes smaller. In addition, the relationship between a quantization parameter QP and an error is such that the error tends to become larger as the quantization parameter QP becomes larger. Therefore, statistical data on the magnitude of error is collected in advance, and defined as a function of bit rate "r" and QP "q".

Specifically, the code size control section 4 prepares each of an average error model for the bit rate, and an average error model for the quantization parameter QP in advance, with respect to the generated code sizes when coding is done by CAVLC. The error models are stored in advance as, for example, mathematical expressions and tables corresponding to each of the quantization parameter QP and the bit rate. From a quantization parameter QP and a bit rate, the code size control section 4 computes correction amounts C_rate and C_qp indicating errors to be corrected, respectively, from the corresponding error models. Of the correction amounts C_rate and C_qp corresponding to the quantization parameter QP and the bit rate, the code size control section 4 selects the smaller one in value as a correction amount Cv in accordance with the following equation.

$$\text{Correction amount } Cv = \min(C\_rate, C\_qp)$$

This makes it possible to prevent a situation in which the amount of error correction becomes so large that the corrected generated code sizes become larger than high-precision generated code sizes computed in the second pre-encoding section 2. It should be noted that the correction amounts C_rate and C_qp each indicate the ratio (%) of a correction amount to each of the generated code sizes (Pre-Encode code size) computed by the first pre-encoding section 1.

The code size control section 4 multiplies each of the generated code sizes computed by the first pre-encoding section 1 by the correction amount Cv in accordance with the equation below, thereby computing a correction amount with respect to the generated code size (hereinafter, this is referred to as CAVLC correction code size).

$$CAVLC \text{ correction code size} = Pre\text{-}Encode \text{ code size} \times Cv$$

The code size control section 4 computes low-precision generated code sizes with respect to CAVLC by adding the CAVLC correction code size to each of generated code sizes.

The second cause of error occurs only when CABAC is selected as the entropy coding scheme. In the first pre-encoding section 1, coding by CABAC is not executed, and low-precision code sizes when coding by CABAC are predicted from the code sizes based on CAVLC. Since CABAC provides better coding efficiency than CAVLC, the generated code size when pre-encoding by CAVLC tends to be somewhat larger than the actual code size. For example, the relationship between a generated code size and an error is such that, when viewed statistically, the magnitude of this error tends to become larger as the bit rate becomes smaller due to the improved efficiency of CABAC. Similarly, this is also corrected by collecting statistical data on the magnitude of error in advance, and preparing an average error model.

It has been found that as compared with an error that occurs in coding based on the code size of CAVLC, an error resulting from CABAC changes on the opposite side with respect to the quantization parameter QP and the bit rate, and the amount of that change is small.

Accordingly, a correction amount with respect to CABAC (hereinafter, this is referred to as CABAC correction amount) is defined as a function of bit rate "r" and QP "q". At this time, a correction amount Cb is computed by the following equation.

$$\text{Correction amount } Cb = \min(r, q)$$

The code size control section 4 multiplies each of the generated code sizes (Pre-Encode code sizes) computed by the first pre-encoding section 1 by the correction amount Cv in accordance with the equation below, thereby computing a correction amount with respect to the generated code size (hereinafter, this is referred to as CABAC correction code size).

CABAC correction code size=Pre-Encode code size×
Cb

Figure 2:
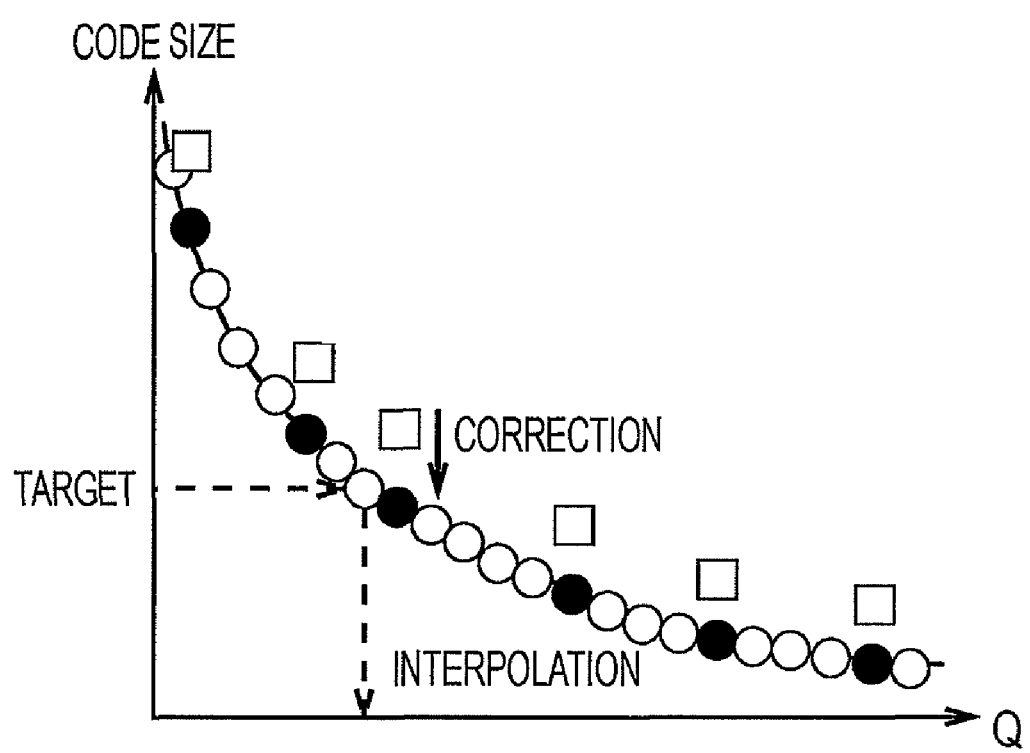
FIG. 2 is a conceptual diagram illustrating that correction is performed on discrete values of QP, and code sizes are calculated by interpolation with respect to QPs therebetween.

The code size control section 4 computes low-precision generated code sizes with respect to CABAC by adding the CABAC correction code size to each of low-precision generated code sizes. As shown in FIG. 2, the code size control section 4 can compute corrected CAVLC correction amount and CABAC correction code size (indicated by black circles) with respect to each of the generated code sizes (indicated by squares) computed by the first pre-encode section 1.

Next, the code size control section 4 performs an estimation process for a quantization parameter (QP). As described above, the first pre-encoding section 1 acquires generated code sizes by performing pre-encoding with discrete values of selected quantization parameter QPl at an arbitrary interval. The code size control section 4 calculates generated code sizes by interpolation (indicated by white circles) with respect to quantization parameters QP other than the selected quantization parameters QPl, among a range of quantization parameters QP that can be taken by a quantization matrix Q Matrix. As the interpolation process, a common interpolation process such as linear interpolation can be used.

That is, as shown in FIG. 2, correction is performed with respect to the discrete values of quantization parameter QP (indicated by squares) obtained in the first pre-encoding section 1 to obtain corrected quantization parameters QP (indicated by black circles), and further, code sizes are calculated by interpolation with respect to quantization parameters QP therebetween (indicated by white and circles).

In this way, the code size control section 4 corrects the generated code sizes computed by the first pre-encoding section 1, for an error in generated code size that occurs in accordance with the simplified process in the first pre-encoding section 1, thereby computing low-precision generated code sizes with respect to CAVLC. Consequently, the code size control section 4 can enhance the precision of prediction of generated code sizes by the simplified coding process. By using the low-precision generated code sizes with respect to CAVLC, the code size control section 4 computes low-precision generated code sizes representing predicted sizes of generated code size due to CABAC. Thus, the code size control section 4 can estimate low-precision generated code sizes due to CABAC without performing CABAC that requires complex processing. From low-precision generated code sizes predicted with selected quantization parameters QPl that are discretely selected, the code size control section 4 predicts low-precision generated code sizes with respect to quantization parameters QP other than the selected quantization parameters QPl by an interpolation process. Consequently, there is no need for the code size control section 4 to code the input image 91 by using all quantization parameters QP, thereby making it possible to simplify the configuration of the first pre-encoding section 1.

[1-2-3. Determination of Predicted Quantization Matrix]

As described above, low-precision generated code sizes are computed with respect to all the quantization parameters QP that can be taken by the quantization matrix Q Matrix. The code size control section 4 is configured to change the quantization matrix Q Matrix in accordance with the coding complexity, and select, on the basis of low-precision generated code sizes corresponding to the changed quantization matrix Q Matrix, a quantization parameter QP that is closest to a target code size as the base quantization parameter $QP_{MB}$.

The code size control section 4 selects, for each quantization matrix Q Matrix, a quantization parameter QP used when a low-precision generated code size closest to a target code size is produced, as a neighboring quantization parameter QPn. The code size control section 4 uses, for example, the neighboring quantization parameter QPn selected for each of quantization matrices Q Matrix, as the coding complexity. Of course, another index such as activity can be used as well. Here, the number of quantization matrices Q Matrix to be switched for use is NumOfQMatrixId, Ids (identifiers) are assigned in ascending order from a quantization matrix Q Matrix with a gentle slope, and the maximum parameter QP within a range that can be taken by each of the quantization matrices Q Matrix is QMatrixTheshold[Id].

The code size control section 4 compares the neighboring quantization parameter QPn and QMatrixTheshold, starting from a quantization matrix Q Matrix with a small value of Id. The code size control section 4 determines a quantization matrix Q Matrix having the smallest Id as a predicted quantization matrix Q MatrixD, among quantization matrices Q Matrix with neighboring quantization parameters QPn smaller than QMatrixTheshold[Id]. The code size control section 4 determines the neighboring quantization parameter QPn in the predicted quantization matrix Q MatrixD as a predicted quantization parameter QPd.

That is, the code size control section 4 determines a quantization matrix Q Matrix having the smallest slope as a predicted quantization matrix Q MatrixD, among quantization matrices Q Matrix that can take quantization parameters QP whose low-precision generated code sizes are close to a target code size. This predicted quantization matrix Q MatrixD is to be used also for the main encoding by the main encoding section 3. Since the code size control section 4 can use the quantization matrix Q Matrix having the smallest slope among those meeting the condition on low-precision generated code size, degradation in image quality can be prevented as much as possible.

It should be noted that the code size control section 4 computes, in order from a quantization matrix Q Matrix with a small value of Id, low-precision generated code sizes with respect to a range of selected quantization parameters QPl that can be taken by the quantization matrix Q Matrix. Then, upon detecting a quantization matrix Q Matrix with a neighboring quantization parameter QPn smaller than QMatrixTheshold[Id], the code size control section 4 determines the quantization matrix Q Matrix and the neighboring quantization parameter QPn as a predicted quantization matrix Q MatrixD and a predicted quantization parameter QPd. At this time, the code size control section 4 causes the first pre-encoding section 1 to start processing on the next picture. That is, the code size control section 4 does not cause the first pre-encoding section 1 to compute low-precision generated code sizes for a quantization matrix Q Matrix with the next Id with respect to the picture being processed. This makes it possible for the code size control section 4 to shorten the processing time required for determining a predicted quantization parameter QPd and a predicted quantization matrix Q MatrixD.

In this way, from among quantization matrices Q Matrix that can take quantization parameters QP whose low-precision generated code sizes become close to a target code size, the code size control section 4 selects a quantization matrix Q Matrix with the smallest slope as a predicted quantization matrix Q MatrixD, in order to prevent degradation in image quality. The code size control section 4 selects a quantization parameter QP in the predicted quantization matrix Q MatrixD with which the low-precision generated code size becomes closest to the target code size, as a predicted quantization parameter QPd. Consequently, the code size control section 4 can select, as a predicted quantization parameter QPd, a quantization parameter QP with which the low-precision generated code size becomes closest to the target code size, while adaptively changing the quantization matrix Q Matrix in such a way as to minimize a decrease in image quality.

[1-3. Determination of Base Quantization Parameter]

The second pre-encoding section 2 actually executes coding similar to the encoder 3 by using a predicted quantization parameter QPd and a predicted quantization matrix Q MatrixD, thereby computing high-precision generated code sizes with high precision. Hereinafter, the generated code sizes computed by the second pre-encoding section 2 will be referred to as high-precision generated code sizes. At this time, the second pre-encoding section 2 computes high-precision generated code sizes by using not only a predicted quantization parameter QPd but also quantization parameters QP preceding and following the predicted quantization parameter QPd, and predicts high-precision generated code sizes in the neighborhood of the predicted quantization parameter QPd by using the rate of their variation.

The code size control section 4 supplies a predicted quantization parameter QPd, a predicted quantization matrix Q MatrixD, and the activity group of each MB to the second pre-encoding section 2. The second pre-encoding section 2 performs second pre-encoding on the basis of these values.

In the second pre-encoding section 2, the input image 91 is inputted to the intra-prediction processing section 21 after undergoing delay processing via the delay buffer 5. The intra-prediction processing section 21 calculates the difference between a predicted image and the input image 91, and generates difference image data. Then, the DCT section 22 executes a DCT process on the difference image data to generate DCT coefficients. The quantization section 23 executes a quantization process on the DCT coefficients to generate quantized coefficients. The entropy-code-length calculating section 24 performs entropy coding on each of the quantized coefficients by using CAVLC or CABAC, thereby calculating high-precision generated code sizes.

It should be noted that in the course of processing in the second pre-encoding section 2, the quantization section 23 transmits the quantized coefficients to the inverse quantization section 27. The inverse quantization section 27 applies inverse quantization to the quantized coefficients to reproduce the DCT coefficients. Then, the IDCT section 26 transforms the DCT coefficients into IDCT, generating a local decode image, and stores the local decode image into the buffer 25.

Here, the quantization section 23 includes three stages of quantization sections 23-1, 23-2, and 23-3 in this example. The entropy-code-length calculating section 24 includes three stages of entropy-code-length calculating sections 24-1, 24-2, and 24-3 in this example. The reason why the number of stages is only three is that the quantization parameter QP has been already roughly estimated by the first pre-encoding over a wide range.

Under this configuration, the quantization section 23 and the entropy-code-length calculating section 24 execute processing in parallel to thereby obtain high-precision generated code sizes with a predicted quantization parameter QPd and quantization parameters preceding and following the predicted quantization parameter QPd. At this time, the entropy-code-length calculating section 24 selects a scheme that is the same as the entropy coding scheme for the main encoding in the main encoding section 3, from either CABAC/CAVLC.

Subsequently, the code size control section 4 determines a base quantization parameter $QP_{MB}$ for a picture to be used in the main encoding, from high-precision generated code sizes obtained by the second pre-encoding. Then, from this determined base quantization parameter $QP_{MB}$ for a picture, a predicted quantization matrix Q MatrixD, and the activity group of each MB, the code size control section 4 transmits information on quantization (such as Q Matrix and QP for each MB) to the main encoding section 3.

More specifically, if a target code size is sandwiched by high-precision generated code sizes obtained by the second pre-encoding, that is, if Generated_bits(QP_precode1+1)
    <=Target_bits<=Generated_bits(QP_precode1−1), a quantization parameter QP that is closest to the target code size is selected as the base quantization parameter $QP_{MB}$.

Otherwise, the code size control section 4 finds the rate of variation in high-precision generated code size respect to a change in quantization parameter QP from the results of the second pre-encoding. The predicted quantization parameter QPd is computed on the basis of the low-precision generated code sizes obtained by the first pre-encoding section 1. Consequently, a quantization parameter QP closest to the target code size exists in the neighborhood of the predicted quantization parameter QPd. If quantization parameters QP are close in value, the rate of variation in generated code size is substantially constant. Accordingly, the code size control section 4 predicts high-precision generated code sizes for individual quantization parameters QP from the predicted quantization parameter QPd and the rate of variation in high-precision generated code size for quantization parameters QP preceding and following the predicted quantization parameter QPd, and selects a quantization parameter QP closest to the target code size as the base quantization parameter $QP_{MB}$.

First, DiffRatio_1 indicating by how many percentages a high-precision generated code size changes when the quantization parameter QP is subtracted by "1" is found as follows from the results of the second pre-encoding 2. It should be noted that Generated_bits indicates a generated code size in the second pre-encoding 2, QP_precode1 indicates a predicted quantization parameter QPd, and QP_precode1−1 indicates a quantization parameter QP that is smaller than the predicted quantization parameter QPd by "1".

DiffRatio_1=(Generated_bits(QP_precode1−1)−Generated_bits(QP_precode1))/Generated_bits(QP_precode1)

DiffRatio_2 indicating by how many percentages a high-precision generated code size changes when the quantization parameter QP is added by 1 is found as follows from the results of the second pre-encoding 2. QP_precode1+1 indicates a quantization parameter QP that is larger than the predicted quantization parameter QPd by "1".

DiffRatio_2=(Generated_bits(QP_precode1)−Generated_bits(QP_precode1+1))/Generated_bits(QP_precode1+1)

The rate of variation DiffRatio in high-precision generated code size in the neighborhood of the predicted quantization parameter QPd is found as follows.

DiffRatio=(DiffRatio_1+DiffRatio_2)/2

That is, DiffRatio is computed as the average of variations in generated code size when the quantization parameter QP changes by "1" in each of the positive and negative directions from the predicted quantization parameter QPd.

Letting DeltaQP be the absolute value of the difference between a quantization parameter QP with which the high-precision generated code size becomes closest to a target code size, and the predicted quantization parameter QPd (QP_precode1), when the quantization parameter QP corresponding to the high-precision generated code size closest to the target code size is smaller than a quantization parameter QP (QP_precode1−1) that is smaller than the predicted quantization parameter QP by 1, the high-precision generated code size (Generated_bits(QP)) for the quantization parameter QP with which the high-precision generated code size becomes closest to the target code size is computed as follows.

$$\text{Generated\_bits(QP)} = \text{Generated\_bits}(\text{QP\_precode1}-1) \times (1.0 + \text{DiffRatio})^{(\text{DeltaQP}-1)}$$

When the quantization parameter QP corresponding to the high-precision generated code size closest to the target code size is larger than a quantization parameter QP (QP_precode1+1) that is larger than the predicted quantization parameter QP by 1, the high-precision generated code size (Generated_bits(QP)) for the quantization parameter QP with which the high-precision generated code size becomes closest to the target code size is computed as follows.

$$\text{Generated\_bits(QP)} = \text{Generated\_bits}(\text{QP\_precode1}+1) \times (1.0 - \text{DiffRatio})^{(\text{DeltaQP}-1)}$$

That is, the code size control section 4 increases or decreases each of high-precision generated code sizes when quantization parameters QP preceding and following a predicted quantization parameter QPd are used, by a code size according to the rate of variation when the value of quantization parameter QP changes by "1" about the predicted quantization parameter QP. The code size control section 4 can compute, with high precision, high-precision generated code sizes when quantization parameters QP in the neighborhood of the predicted quantization parameter QPd are used.

In the manner as described above, the code size control section 4 selects a quantization parameter QP closest to the target code size as a base quantization parameter $QP_{MB}$ to be used as the average quantization parameter (BaseQP) in the main encoding.

As described above, in the second pre-encoding section 2, pre-encoding is performed with the predicted quantization parameter QPd (QP_precode1) estimated by the first pre-encoding section 1, and the next larger quantization parameter QP (QP_precode1+1) and the next smaller quantization parameter QP (QP_precode1−1). Here, to reduce the circuit scale, as described above, only the quantization section 23 and the entropy-code-length calculating section 24 are parallelized, and other processes are shared.

At this time, the local decode image used for the intra-prediction process is data quantized with the predicted quantization parameter QPd (QP_precode1) estimated on the basis of the results of the first pre-encoding section 1. That is, the data to be processed in the inverse quantization and IDCT is the quantized output of the predicted quantization parameter QPd (QP_precode1). This means that inputs for the intra-prediction process in the pre-encoding using the quantization parameters QP (QP_precode1+1 and QP_precode1−1) preceding and following the predicted quantization parameter QPd are not the local decode images of these quantization parameters themselves but are substituted for by the local decode image of the predicted quantization parameter QPd (QP_precode1).

In this way, by prediction of low-precision generated code sizes based on the results of the first pre-encoding section 1, the code size control section 4 computes high-precision generated code sizes by the same coding as the main encoding, with a predicted quantization parameter QPd for which there is an extremely high possibility that the low-precision generated code size becomes closest to a target code size, and its preceding and following quantization parameters QP. Consequently, the code size control section 4 can substantially accurately compute high-precision generated code sizes when the predicted quantization parameter QPd and its preceding and following quantization parameters QP are used. Further, the present invention focuses attention on the fact that within a narrow range, the rate of variation in high-precision generated code size accompanying a change in quantization parameter QP is substantially constant. The code size control section 4 computes high-precision generated code sizes when quantization parameters QP in the neighborhood of the predicted quantization parameter QPd are used, on the basis of the predicted quantization parameter QPd and the rate of variation in high-precision generated code size with its preceding and following quantization parameters QP. Consequently, the code size control section 4 can compute high-precision generated code sizes substantially accurately also for quantization parameters QP in the neighborhood of the predicted quantization parameter QPd.

[1-4. Main Encoding]

The main encoding section 3 performs main encoding by using a base quantization parameter $QP_{MB}$ obtained on the basis of the results of the second pre-encoding section 2, as well as a predicted quantization matrix Q Matrix obtained on the basis of the results of the first pre-encoding section 1, the activity group, the intra-prediction mode, and the like. That is, in the main encoding section 3, upon receiving the input image 91 that has undergone delay processing via the delay buffer 6, in the intra-prediction processing section 31, the difference image data between a predicted image and the input image 91 is calculated in the intra-prediction mode determined at the time of the first pre-encoding. The DCT section 32 performs a DCT process, and the quantization section 33 performs quantization of DCT coefficients. The output (quantized coefficients) of the quantization section 33 is also transmitted to the inverse quantization section 37. The inverse quantization section 37 applies inverse quantization to the quantized coefficients to reproduce the DCT coefficients. Then, the IDCT section 36 transforms the DCT coefficients into IDCT, generating a predicted image, and stores the predicted image into the buffer 35.

In this way, after the DCT by the DCT section 32 and the quantization of DCT coefficients by the quantization section 33 as described above, entropy coding is performed by the entropy coding section 34, and an output stream 92 set to a target code size is outputted.

[1-5. Conclusion]

In this way, in the image coding apparatus 100 according to this embodiment, in the first pre-encoding by the first pre-encoding section 1, low-precision generated code sizes when encoding is performed with a plurality of selected quantization parameters QPl are roughly calculated, thereby estimating a predicted quantization parameter QPd that achieves a target code size.

At this time, the first pre-encoding section 1 performs encoding in parallel in order to calculate generated code sizes in the case when encoding is performed with selected quantization parameters QPl at an arbitrary interval.

Generally, to perform encoding in parallel, the circuit scale becomes very large. However, to reduce the circuit scale, this embodiment solves the problem by making processes as common as possible while realizing parallel encoding.

That is, more specifically, in the first pre-encoding section 1, as previously described, only the quantization section 14 and the entropy-code-length calculating section 15 are provided in parallel, and other processes are shared. In addition, to eliminate an inverse quantization section, an IDCT section, and a buffer, an input image is used as a predicted image to perform an intra-prediction process.

On the other hand, when using CABAC in entropy coding, it is often impossible to perform processing at high bit rate. That is, in the first pre-encoding section 1, if CABAC is used in entropy coding, when attempting to perform code size calculation with a given quantization parameter QP for code size prediction, if the code size with the quantization parameter QP is large (that is, if the value of each quantized coefficient is large), it is impossible to predict a generated code size.

CABAC is an entropy coding scheme that compresses data by performing probability calculation for every 1 bit. Processing 1 bit at a time means that as the code size becomes larger, the processing time becomes longer, and processing is not finished within a certain time period (for example, the time period of 1 frame). Therefore, if CABAC is used in entropy coding, when the code size is large, the first pre-encoding section 1 cannot calculate the generated code size after entropy coding, making it impossible to predict a generated code size at high bit rate.

In this regard, in the first embodiment, the first pre-encoding section 1 uses CAVLC for code size calculation. In this way, in the first pre-encoding section 1, by performing simplified pre-encoding with reduced circuit scale and reduced processing, low-precision generated code sizes are roughly estimated. Then, the code size control section 4 selects a quantization parameter QP having a low-precision generated code size close to a target code size, as a predicted quantization parameter QPd.

In the second pre-encoding section 2, in view of the fact that the estimation of a predicted quantization parameter QPd by the first pre-encoding section 1 is subject to an error, pre-encoding is performed again, thereby enhancing the precision of quantization parameter QP estimation. That is, by performing pre-encoding again with quantization parameters QP in the vicinity of the predicted quantization parameter QPd that is roughly estimated by the first pre-encoding section 1, high-precision generated code sizes are acquired, and a quantization parameter QP closest to a target high-precision generated code size is found again. The entropy-code-length calculation uses a scheme (CABAC or CAVLC) that is the same as the main encoding.

It should be noted that although an error due to a difference in input (local decode image) for an intra-prediction process exists, since the quantization parameters QP are substantially the same in value, and the amounts of distortion due to encoding are also substantially the same, this can be considered negligible.

[1-6. Procedure]

Hereinbelow, referring to the flowchart in FIG. 3, a procedure RT1 of coding by the image coding apparatus 100 according to an embodiment of the present invention will be described in detail. A part or all of this procedure also corresponds to an image coding method according to an embodiment.

First, the activity calculating section 16 calculates activities of individual MBs, and divides the MBs into activity groups in accordance with their values (step S1).

Subsequently, the intra-prediction mode determining section 11 determines an intra-prediction mode on the basis of the input image 91 (step S2). This intra-prediction mode is also used for the second pre-encoding by the second pre-encoding section 2, and for the main encoding by the main encoding section 3.

Next, the intra-prediction processing section 12 calculates the difference image data between a predicted image and the input image. As the predicted image here, the input image 91 is used to reduce processing. Then, the DCT section 13 performs an integer-precision DCT, and transmits DCT coefficients to the quantization section 14 (step S3).

The quantization section 14 quantizes the DCT coefficient values, with a plurality of selected quantization parameters QPl at an arbitrary interval as the average quantization parameter (BaseQP) for a picture. The entropy-code-length calculating section 15 codes the quantized coefficients into variable length codes, and performs code length calculation, thereby acquiring generated code sizes for individual selected quantization parameters QPl (step S4). At this time, as described above, the quantization parameter QP for each MB is given a value that takes activity into consideration, and encoded. That is, as described above, the quantization parameter QP for each MB is found by adding an offset that is dependent on the activity group, to the average quantization parameter (BaseQP) for a picture.

It should be noted that to handle an adaptive quantization matrix Q Matrix switching process, the above-mentioned process is performed for each quantization matrix Q Matrix. That is, for each quantization matrix Q Matrix, pre-encoding is performed with discrete (discontinuous) values of selected quantization parameter QPl to acquire one picture's worth of generated code size. At this time, the selected quantization parameters QPl are selected so as to cover the range of quantization parameters QP that can be taken for each quantization matrix Q Matrix.

Next, the code size control section 4 performs a correction process on the generated code sizes computed by the first pre-encoding section 1, thereby computing low-precision generated code sizes. The code size control section 4 performs correction of an error resulting from the simplification of pre-encoding, and computes, by an interpolation process, low-precision generated code sizes corresponding to quantization parameters QP other than the selected quantization parameters QPl (step S5).

The code size control section 4 executes the process in step S5 with respect to each quantization matrix Q Matrix, thereby calculating low-precision generated code sizes for each quantization matrix Q Matrix (step S6). Since low-precision generated code sizes with respect to all the required quantization parameters QP are found through the above process, of quantization parameters QP that can produce a low-precision generated code size closest to a target code size among those, a quantization matrix Q Matrix with the smallest slope is selected as a predicted quantization matrix Q MatrixD. Further, the code size control section 4 selects a quantization parameter QP that can produce a low-precision generated code size closest to the target code size corresponding to the predicted quantization matrix Q MatrixD, as a predicted quantization parameter QPd. (step S7). In addition, by selecting the quantization matrix Q Matrix as mentioned above, the range of quantization parameters QP that can be taken is limited, thereby making it possible to reduce the range of selected quantization parameters QPl when computing low-precision generated code sizes in the first pre-encoding section 1. These serve as the predicted quantization matrix Q MatrixD and the predicted quantization parameter QPd that are determined in the first pre-encoding section 1.

Subsequently, a generated-code-size acquiring process by the second pre-encoding section 2 is performed (steps S8 to S10). The purpose of the second pre-encoding section 2 is to enhance the precision of base quantization parameter $QP_{MB}$ estimation by performing pre-encoding again, in view of the fact that the estimation of a predicted quantization parameter QPd by the first pre-encoding section 1 is subject to an error.

That is, by performing pre-encoding again with quantization parameters QP in the vicinity of the predicted quantization parameter QPd roughly estimated as a result of the first pre-encoding section 1, high-precision generated code sizes are acquired, and a quantization parameter QP closest to the target code size is found again. The entropy-code-length calculation uses a scheme (CABAC or CAVLC) that is the same as the main encoding.

Specifically, an intra-prediction process by the intra-prediction processing section 21 and a DCT by the DCT section 22 are performed using the intra-prediction mode determined as a result of the first pre-encoding section 1 (step S8). As a local decode image (predicted image) to be used in intra-prediction, in the second pre-encoding section 2, a local decode image quantized with the predicted quantization parameter QPd (QP_precode1) estimated as a result of the first pre-encoding section 1 is shared.

In quantization, the predicted quantization parameter QPd (QP_precode1), the quantization matrix Q Matrix, and the activity group determined as a result of the first pre-encoding section 1 are used. The predicted quantization parameter QPd (QP_precode1) is set in the quantization section 23-1, a quantization parameter QPd (QP_precode1−1) that is smaller than the predicted quantization parameter QPd by "1" is set in the quantization section 23-2, and a quantization parameter QPd (QP_precode1+1) that is larger than the predicted quantization parameter QPd by "1" is set in the quantization section 23-3.

Further, the quantization parameter (QP) for each MB is given a value that takes activity into consideration, and encoded. Through the above second pre-encoding, one picture's worth of high-precision generated code size can be acquired (step S9).

Subsequently, the code size control section 4 determines a base quantization parameter $QP_{MB}$ from the high-precision generated code sizes obtained on the basis of the second pre-encoding section 2 (step S10).

Subsequently, the main encoding section 3 performs main encoding (step S11). In the main encoding, encoding is performed by using the base quantization parameter $QP_{MB}$ for a picture determined as a result of the second pre-encoding section 2, and the predicted quantization matrix Q MatrixD and Activity Group determined as a result of the first pre-encoding section 1. In this way, a series of processing related to coding is ended.

Hereinbelow, referring to the flowchart in FIG. 4, a further description will be given of a Q Matrix determining procedure RT2 executed in step S7 in the procedure RT1 of coding by the image coding apparatus 100.

When this process is started, after first initializing Id to Id=0 (step S21), the code size control section 4 compares, from a quantization matrix Q-Matrix with a small value of Id, a quantization parameter (QP) whose low-precision generated code size is closest to a target code size, with the maximum parameter QP (QMatrixTheshold[Id]) that can be taken in the quantization matrix Q-Matrix (step S22). Then, if the quantization parameter (QP) whose low-precision generated code size is closest to the target code size in the Id-th quantization matrix Q-Matrix is smaller than QMatrixTheshold[Id], the code size control section 4 determines the current quantization matrix Q-Matrix as a predicted quantization matrix Q MatrixD. Further, upon determining the quantization parameter (QP) whose low-precision generated code size is closest to the target code size in the predicted quantization matrix Q MatrixD, as a predicted quantization parameter QPd (step S23), the code size control section 4 ends the Q Matrix determining procedure RT2.

On the other hand, if, in step S22, the quantization parameter (QP) whose low-precision generated code size is closest to the target code size in the Id-th quantization matrix Q-Matrix is equal to or larger than QMatrixTheshold[Id], the code size control section 4 increments Id (step S24). The code size control section 4 judges whether or not Id=the total number of quantization matrices Q-Matrix minus "1" (NumOfQMatrixId−1) (step S25). Then, if Id=NumOfQMatrixId−1 does not hold, the processing returns to step S22, and the next quantization matrix Q-Matrix is checked. On the other hand, if Id=NumOfQMatrixId−1 holds, the quantization matrix Q-Matrix having the steepest slope (the quantization matrix Q-Matrix whose ID is NumOfMatrixId) is selected (step S23), and the Q Matrix determining procedure RT2 is ended.

Figure 4:
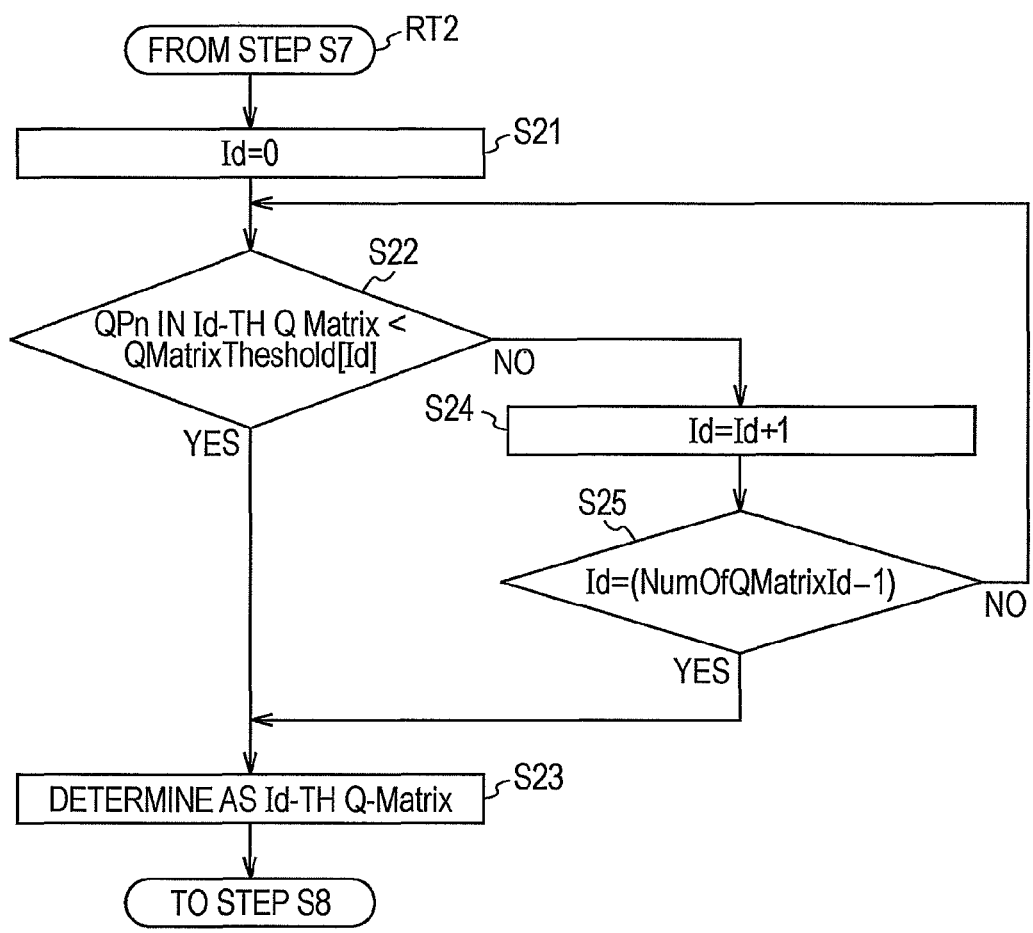
FIG. 4 is a flowchart further illustrating an adaptive Q Matrix switching process.

Through this Q Matrix determining procedure RT2 in FIG. 4, for each quantization matrix Q-Matrix, the code size control section 4 sets the maximum parameter QP that can be taken, and judges, in order from a quantization matrix Q-Matrix with a gentle slope, whether or not a low-precision generated code size corresponding to the quantization parameter QP whose low-precision generated code size is estimated to be closest to the target code size really indicates a value close to the target code size. Then, if the value is close, then the corresponding quantization matrix Q-Matrix is determined as a predicted quantization matrix Q MatrixD to be used in the main encoding.

As described above, according to an embodiment of the present invention, pre-encoding is carried out twice on a picture basis. Then, to solve the problem that the amount of processing increases and the scale of circuit for encoding increases as a result for efficiency enhancement, the image coding apparatus 100 adopts a partial parallel configuration based on partial commonality of circuits. Consequently, the configuration of the pre-encoders is simplified while correcting an error resulting from the simplification by statistical data.

Therefore, it is possible for the image coding apparatus 100 to match the main-encoding generated code size generated in the main encoding to a target code size given to one picture, without performing intra Feed Back control. Thus, it is possible for the image coding apparatus 100 to eliminate problems with Feed Back control, such as adverse effects caused by inappropriate initial values of Feed Back parameters, and an inappropriate target code size distribution. As a result, it is possible for the image coding apparatus 100 to match the main-encoding generated code size to the target code size, and to determine a code size distribution that takes visual characteristics into consideration, that is, an appropriate quantization parameter.

It should be noted that the present invention is not limited to the above-described embodiment, but various improvements or modifications are possible without departing from the scope thereof.

For example, the above-mentioned image coding apparatus 100 and image coding method can be also implemented as a computer program installed in the apparatus or a recording medium recording the program, and a computer program implementing the method or a recording medium recording the program.

[1-7. Operation and Effects]

According to the above configuration, in the image coding apparatus 100 as an image processing apparatus, as for DCT coefficients as simple coded data obtained by coding the input image 91 by simple processing, the input image 91 is coded by at least quantizing the input image 91 as an input image on the basis of selected quantization parameters QPl discretely selected from quantization parameters QP that are quantization factors, thereby calculating generated code sizes of the input image 91 upon coding.

The image coding apparatus 100 corrects an error in the generated code sizes of the input image upon coding which occurs in accordance with the simple processing, thereby computing low-precision generated code sizes.

The image coding apparatus 100 computes low-precision generated code sizes when the input image 91 is coded on the basis of quantization parameters QP other than the selected quantization parameters QPl, by an interpolation process with respect to the low-precision generated code sizes when the input image 91 is coded on the basis of the selected quantization parameters QPl.

Consequently, the image coding apparatus 100 can compute low-precision generated code sizes based on all quantization parameters QP without coding the all quantization parameters QP, thereby making it possible to simplify the computation of low-precision generated code sizes and also reduce the computation circuit.

On the basis of the low-precision generated code sizes computed by the coding based on the selected quantization parameters QPl and the interpolation process, the image coding apparatus 100 determines, as a base quantization parameter $QP_{MB}$, a quantization parameter QP with which the main-encoding generated code size when coding the input image 91 is predicted to be closest to a target code size. The image coding apparatus 100 performs coding (main encoding) on the input image 91 by the main encoding section 3 on the basis of the base quantization parameter $QP_{MB}$.

Consequently, the image coding apparatus 100 can determine the base quantization parameter $QP_{MB}$ on the basis of low-precision generated code sizes produced by simple processing, thereby making it possible to simplify the process for determining the base quantization parameter $QP_{MB}$.

The image coding apparatus 100 codes the input image 91 on the basis of an adaptive quantization parameter QPt obtained by adding an offset according to activity to the base quantization parameter $QP_{MB}$.

Consequently, the image coding apparatus 100 can code the input image 91 by using an appropriate adaptive quantization parameter QPt according to the image quality, thereby making it possible to minimize a decrease in image quality of the output stream 92.

The image coding apparatus 100 uses selected quantization parameters QPl selected from within a range of quantization parameters QP that can be taken by a quantization matrix Q Matrix used in quantization.

Consequently, since the image coding apparatus 100 can limit the range of quantization parameters QP, the number of selected quantization parameters QPl can be reduced to simplify the circuit configuration. In addition, since the intervals of selected quantization parameters QPl can be set small, the precision of low-precision generated code sizes can be enhanced.

The image coding apparatus 100 determines, as a base quantization parameter $QP_{MB}$, a quantization parameter QP with which the generated code size when coding the input image 91 is predicted to be closest to a target code size, in the following manner on the basis of the low-precision generated code sizes computed by the coding based on the selected quantization parameters QPl and the interpolation process. That is, the image coding apparatus 100 selects a quantization parameter QP corresponding to a generated code size that is closest to a target code size among the low-precision generated code sizes, as a predicted quantization parameter QPd. The image coding apparatus 100 codes the input image 91 on the basis of the selected predicted quantization parameter QPd and quantization parameters QP in the neighborhood of the predicted quantization parameter QPd, thereby computing high-precision generated code sizes of the input image 91 upon coding. If a high-precision generated code size when coding the input image 91 on the basis of one of the predicted quantization parameter QPd and the quantization parameters QP in the neighborhood of the predicted quantization parameter QPd is closest to the target code size, the image coding apparatus 100 selects, from among the predicted quantization parameter QPd and the quantization parameters QP in the neighborhood of the predicted quantization parameter QPd, a quantization parameter QP corresponding to the high-precision generated code size closest to the target code size, as the base quantization parameter $QP_{MB}$.

Consequently, the image coding apparatus 100 can compute generated code sizes based on the predicted quantization parameter QPd and the quantization parameters QP in the neighborhood thereof. This predicted quantization parameter QPd is predicted to be in the neighborhood of the base quantization parameter $QP_{MB}$ that can produce a main-encoding generated code size closest to the target code size. Thus, the image coding apparatus 100 can code the input image 91 on the basis of the predicted quantization parameter QPd having a high possibility of being a quantization parameter QP that can produce a generated code size closest to the target code size, and compute the resulting generated code size.

The image coding apparatus 100 computes generated code sizes in coding the input image 91 by using quantization matrices Q Matrix in order from one with a small slope, and if the predicted quantization parameter QPd falls within a range that can be taken by a used quantization matrix Q Matrix, determines the used quantization matrix Q Matrix as a predicted quantization matrix Q MatrixD to be used by the main encoding section 3. The image coding apparatus 100 sets the quantization parameters QP immediately preceding and following the predicted quantization parameter QPd as the quantization parameters QPd in the neighborhood of the predicted quantization parameter QPd. If the target code size falls within the range of high-precision generated code sizes when coding the input image 91 on the basis of the predicted quantization parameter QPd and the quantization parameters QP in the neighborhood of the predicted quantization parameter QPd, the image coding apparatus 100 selects a quantization parameter QP corresponding to a high-precision generated code size closest to the target code size, as the base quantization parameter $QP_{MB}$ from among the predicted quantization parameter QPd and the quantization parameters QP in the neighborhood of the predicted quantization parameter QPd.

Consequently, the image coding apparatus 100 can determine the base quantization parameter $QP_{MB}$ on the basis of the high-precision generated code size when actually coding the input image 91 with the base quantization parameter $QP_{MB}$, thereby making it possible to enhance the precision of detection of the base quantization parameter $QP_{MB}$.

If the target code size does not fall within the range of the generated code sizes when coding the input image 91 on the basis of the predicted quantization parameter QPd and the quantization parameters QP in the neighborhood of the predicted quantization parameter QPd, the image coding apparatus 100 computes a rate of variation DiffRatio in high-precision generated code size accompanying variation in quantization parameter QP, from the high-precision generated code sizes when coding the input image 91 on the basis of the predicted quantization parameter QPd and the quantization parameters QP in the neighborhood of the predicted quantization parameter QPd. From the rate of variation DiffRatio computed by a rate-of-variation computing section, the image coding apparatus 100 computes high-precision generated code sizes when coding the input image 91 on the basis of quantization parameters QP other than the predicted quantization parameter QPd and the quantization parameters QP in the neighborhood of the predicted quantization parameter QPd. The image coding apparatus 100 selects, as the base quantization parameter $QP_{MB}$, a quantization parameter QP corresponding to a generated code size closest to the target code size, among the high-precision generated code sizes.

Consequently, by exploiting the property that the rate of variation DiffRatio in high-precision generated code size is substantially constant within a close range of quantization parameters QP, the image coding apparatus 100 can compute high-precision generated code sizes for quantization parameters QP in the vicinity of the predicted quantization parameter QPd with high precision.

The image coding apparatus 100 computes low-precision generated code sizes of the input image 91 upon simple coding, through simple processing. Consequently, in the image coding apparatus 100, the configuration of the first pre-encoding section 1 can be simplified.

The image coding apparatus 100 computes high-precision generated code sizes of the input image 91 upon coding that is executed by the second pre-encoding section 2, through the same processing as in the main encoding section 3. Consequently, the image coding apparatus 100 can determine the base quantization parameter $QP_{MB}$ on the basis of a high-precision generated code size indicating substantially the same code size as the main-encoding generated code size. Consequently, the image coding apparatus 100 can make the main-encoding generated code size when performing main coding (main encoding) using the base quantization parameter $QP_{MB}$ close to the target code size.

The image coding apparatus 100 performs main encoding on the input image 91 on the basis of the base quantization parameter $QP_{MB}$ by the main encoding section 3, and codes the input image 91 by the first encoding section 1 through simple processing in comparison to the main encoding.

Consequently, on the basis of low-precision generated code sizes roughly estimated by simple processing, the image coding apparatus 100 first determines a predicted quantization parameter QPd that is predicted to be in the neighborhood of the base quantization parameter $QP_{MB}$. Then, the image coding apparatus 100 determines the base quantization parameter $QP_{MB}$ on the basis of the predicted quantization parameter QPd by the second pre-encoding section 2. Consequently, the image coding section 100 can determine the base quantization parameter $QP_{MB}$ with high precision by means of a simple configuration.

The image coding apparatus 100 executes intra-prediction using a local decode image as a predicted image, by the main encoding section 3 before quantization. By executing intra-prediction using the input image 91 as a predicted image by the first pre-encoding section 1 before quantization, the image coding apparatus 100 computes low-precision generated code sizes of the input image 91 upon simple coding. The image coding apparatus 100 corrects the low-precision generated code sizes for an error that occurs due to the use of the input image 91 as a predicted image.

The image coding apparatus 100 corrects an error that occurs due to the use of the input image 91 as a predicted image, by using error information that is modeled by statistics in advance, thereby computing the low-precision generated code sizes.

This error information is defined as a function of quantization parameters QP and generated code sizes of the input image 91 upon coding.

Consequently, in the image coding apparatus 100, since the error can be defined appropriately, the CAVLC correction amount can be computed appropriately to enhance the precision of low-precision generated code sizes.

The image coding apparatus 100 has pieces of error information each modeled with quantization parameters QP and low-precision generated code sizes of the input image 91 upon coding as indices, and determines a CAVLC correction amount from a piece of error information indicating a smaller amount of error.

Consequently, the image coding apparatus 100 can prevent the CAVLC correction amount from becoming unnecessarily large, and enhance the precision of low-precision generated code sizes after the correction.

The image coding apparatus 100 executes variable length coding or arithmetic coding while switching therebetween in accordance with the input image 91, after quantization of the input image 91 by the main encoding section 3. The image coding apparatus 100 executes the variable length coding by the second pre-encoding section 2 to compute generated code sizes of the input image 91 upon the variable length coding, and when the main encoding section 3 executes the arithmetic coding on the input image 91, corrects the generated code sizes of the input image 91 upon the variable length coding to compute low-precision generated code sizes of the input image 91 upon the arithmetic coding.

Consequently, since the image coding apparatus 100 can predict low-precision generated code sizes of the input image 91 upon arithmetic coding without executing the arithmetic coding, there is no need to provide a complex circuit for arithmetic coding.

The image coding apparatus 100 corrects the generated code sizes of the input image 91 upon variable length coding, by using error information modeled by statistics in advance, thereby predicting low-precision generated code sizes of the input image 91 upon arithmetic coding.

Consequently, the image coding apparatus 100 can appropriately define an error due to arithmetic coding which tends to be relatively complex, thereby making it possible to compute the CABAC correction amount appropriately to enhance the precision of low-precision generated code sizes.

An image coding apparatus 200 executes intra-prediction using a local decode image as a predicted image by the main encoding section 3 before quantization. When coding the input image 91 on the basis of a predicted quantization parameter QPd and quantization parameters QP in the neighborhood of the predicted quantization parameter QPd, the image coding apparatus 200 uses a local decode image based on the predicted quantization parameter QPd as a predicted image for each of the quantization parameters QP in the neighborhood of the predicted quantization parameter QPd.

Consequently, in the image coding apparatus 100, the local image based on the predicted quantization parameter QPd can be shared with quantization parameters QP in the neighborhood of the predicted quantization parameter QPd, thereby making it possible to simplify the circuit configuration.

Figure 5:
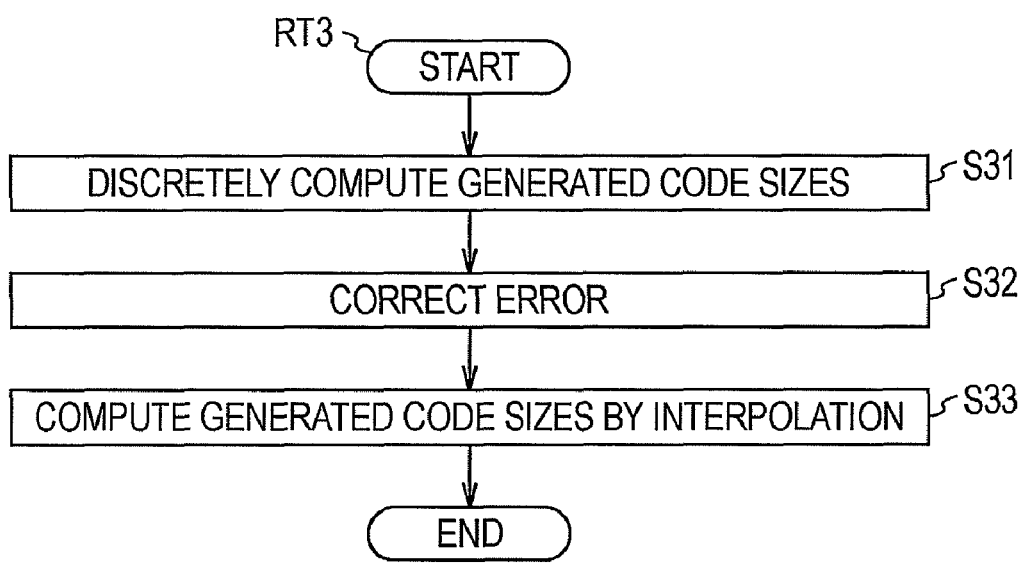
FIG. 5 is a flowchart illustrating a computing process for low-precision generated code sizes according to the present invention.

According to the above configuration, as shown in the flowchart in FIG. 5, the image coding apparatus 100 codes the input image 91 by simple coding using selected quantization parameters QPl that are discretely selected, thereby computing generated code sizes (step S31), and corrects an error in the generated code sizes which occurs due to the simple coding (step S32) to thereby compute low-precision generated code sizes. The image coding apparatus 100 performs interpolation on the corrected generated code sizes, thereby computing low-precision generated code sizes with respect to quantization parameters QP other than the selected quantization parameters QP1 (step S33).

Consequently, the image coding apparatus 100 can compute low-precision generated code sizes with relatively high precision by means of a simple configuration using simple coding and selected quantization parameters QP1.

2. Second Embodiment

In a second embodiment shown in FIGS. 6 to 9, portions corresponding to the first embodiment shown in FIGS. 1 to 5 are denoted by the same symbols, and description of the same portions is omitted. The second embodiment differs from the first embodiment in that there is provided a previous-mode-estimation pre-encoding section 40 that executes a back search.

[2-1. Back Search]

The present invention concerns, for example, an image coding apparatus or the like, and relates to, in particular, a technical field of preventing image quality degradation at the time of dubbing and effecting a control to a desired main-encoding generated code size.

In the related art, to perform transmission of video data between television broadcasting stations, or perform duplication of video data by using a plurality of video tape recorders (VTR apparatus), video data compressed/coded in MPEG (Moving picture experts group) 2 scheme is decompressed/decoded, and then compressed/coded again. It is thus necessary to connect the encoder and the decoder serially in tandem.

Further, as a technique for reducing degradation of video quality due to repetition of compression/coding and decompression/coding at the time of such tandem connection, a so-called "back search" technique is adopted.

Here, "back search" is a technique with which, by exploiting the property that the total sum of the remainders of discrete cosine transfer (DCT) coefficients becomes minimum when using a quantization step used in the previous compression/coding or a quantization step that is in a multiple relation thereto, a quantization step relating to the smallest value is found as the optimal quantization step.

As for a technique using this "back search", for example, Patent Document 1 discloses a video data compression apparatus with which the quantization step in the previous compression/coding is reproduced by the back search scheme, and input video data is compressed/coded again with the same quantization step and GOP (Group of pictures) phase as those of the previous time, thereby preventing degradation of video quality occurring when the encoder and the decoder are connected in tandem and compression/coding and decompression/decoding of video data are repeated.

As a method for preventing degradation when dubbing for coding schemes using orthogonal transformation such as this MPEG2, there is a method of reconstructing or reusing the quantization step or the Inter-predicted image (motion vector) (see, for example, Patent Document 2).

Patent Document 2: Japanese Unexamined Patent Application Publication No. 10-174098

On the other hand, for H264 (AVC; Advanced Video Coding; advanced moving image compression/coding standard) Intra images, there are intra-frame predictions (Intra predictions), and degradation when dubbing can be prevented by reconstructing the quantization matrix Q Matrix on a picture basis, the intra-prediction mode on a DCT block basis, and the quantization step on a macro block basis.

[2-2. Configuration of Image Coding Apparatus]

Figure 6:
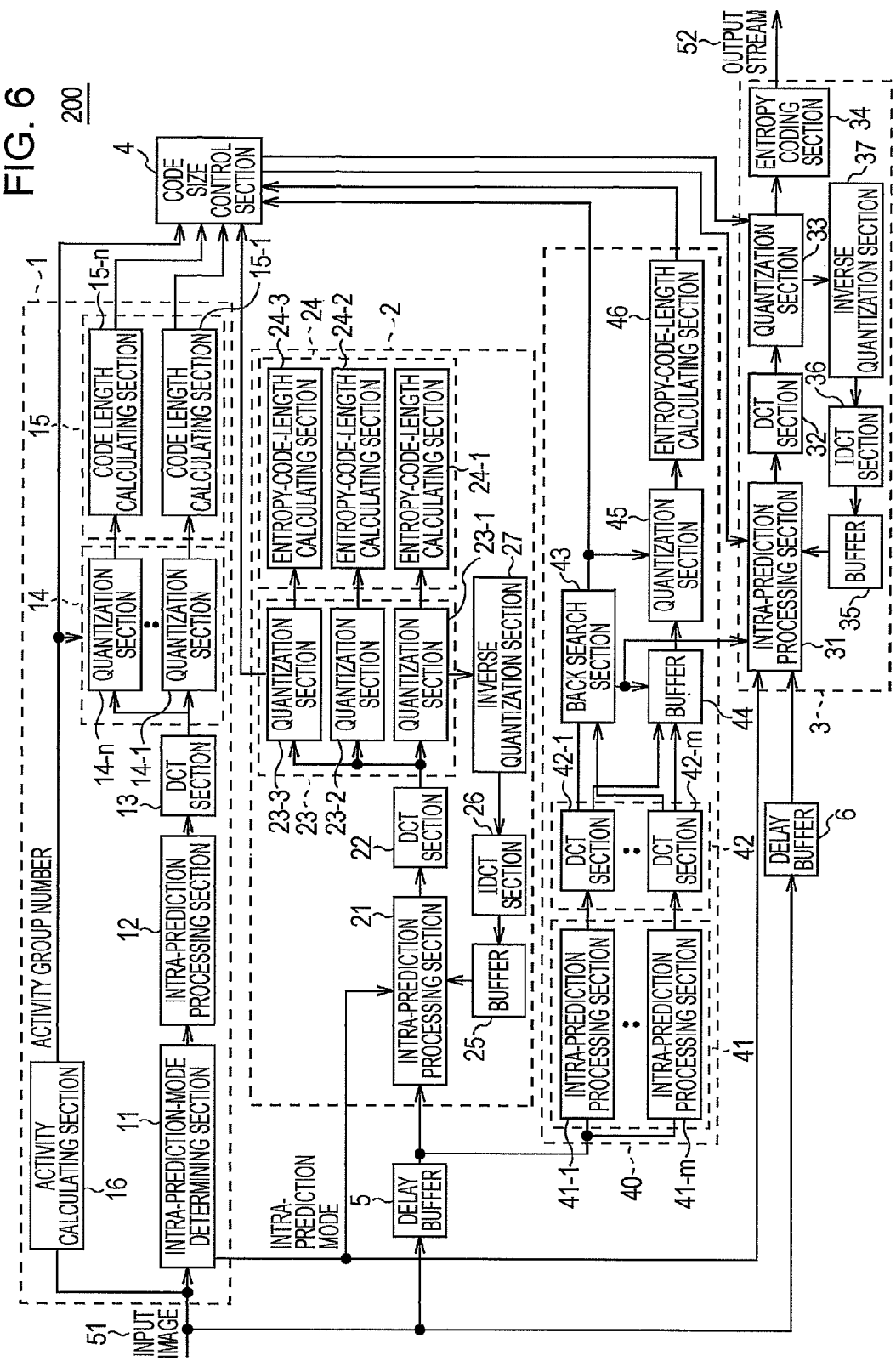
FIG. 6 is a configuration diagram of an image coding apparatus according to a second embodiment of the present invention.

FIG. 6 shows and explains the configuration of the image coding apparatus 200 according to an embodiment of the present invention.

That is, in order to realize a favorable code size distribution within a picture, and improve the dubbing characteristics at the same time when performing code size control in image compression schemes using arithmetic coding represented by H/264/AVC (Advanced Video Coding; advanced moving image compression/coding standard), pre-encodings by the second pre-encoding section 2 and the previous-mode-estimation pre-encoding section 40 are performed in parallel by using parameters found in the first pre-encoding section 1, and it is determined whether to encode in a dubbing mode or to encode in an original image mode.

Then, in the previous-mode-estimation pre-encoding section 40, by using a predicted quantization matrix Q MatrixD found in the first pre-encoding section 1, and performing an estimation process with respect to a certain range of quantization parameters QP above and below a predicted quantization parameter QPd found in the first pre-encoding section 1 as a starting point, the quantization parameter QP used in the previous coding is found, thereby limiting the search range of the back search process to reduce the circuit scale.

Further, the image coding apparatus 200 performs the processing by the second pre-encoding section 2 and the previous-mode-estimation pre-encoding section 40 in parallel, thereby making it possible to deal with cases where the code size based on the back search results does not meet a condition. Consequently, the image coding apparatus 200 ensures that the estimation range for a quantization parameter QP can be taken also in the direction in which the code size increases.

Then, in the main encoding section 3, main encoding is performed by switching parameters used for encoding depending on whether the encoding mode is the original image mode or dubbing mode.

The previous-mode-estimation pre-encoding section 40 is a module that performs pre-encoding for estimating the previous mode, and includes an intra-prediction processing section 41, a DCT section 42, a back search section 43, a buffer 44, a quantization section 45, and an entropy-code-length calculating section 46.

The code size control section 4 is a module that performs code size control.

It should be noted that AVC Intra has a property such that when, at the time of decoding, decoding an image that has undergone coding and decoding once, if the quantization parameter QP and the intra-prediction mode used in the previous coding are used, since quantization distortion has already been dropped in the previous coding, further quantization distortion is unlikely to occur. Detecting the quantization parameter QP and the intra-prediction mode used in the previous coding in this way will be referred to as "back search".

The back search section 43 includes a quantization-parameter QP detecting function, and an intra-prediction-mode detecting function. By means of the quantization-parameter QP detecting function, the back search section 43 detects the quantization parameter QP used in the previous encoding, on the basis of DCT coefficients obtained in the course of the previous encoding. Hereinafter, the detected quantization parameter QP will be referred to as detection quantization parameter QPe. Specifically, the back search section 43 detects the detection quantization parameter QPe by using the remainders obtained when dividing DCT coefficients by rescaling factors RF based on a plurality of quantization parameters QP for each MB. Then, by means of the intra-prediction-mode detecting function, the back search section 43 detects the intra-prediction mode used in the previous coding on the basis of the detection quantization parameter QPe that has been detected. The details of this configuration are described in Patent Document 3. It should be noted that in this embodiment, to reduce processing, only detection of the detection quantization parameter QPe and the intra-prediction mode is executed as the back search, and detection of a quantization matrix Q MatrixE is not executed.

Patent Document 3: International Application Number PCT/JP2008/066917

The entropy-code-length calculating section 46 selects a scheme that is the same as entropy coding in the main encoding by the main encoding section 3 from CABAC/CAVLC. The previous-mode-estimation pre-encoding section 40 computes a back-search generated code size on the basis of the detection quantization parameter QPe and the detected intra-prediction mode. The code size control section 4 judges whether a target code size is met, from the back-search generated code size thus obtained.

The code size control section 4 determines whether to encode in the original image mode or to encode in the dubbing mode from the results of the second pre-encoding section 2 and the previous-mode-estimation pre-encoding section 40, thereby determining the final parameters for encoding (detailed description will be given later). The code size control section 4 passes the result of determination on original image mode/dubbing mode, and the base quantization parameter $QP_{MB}$, the predicted quantization matrix Q MatrixD, and the intra-prediction mode, as well as the activity group of each MB (hereinafter, these will be collectively referred to as main-encoding information), to the main encoding section 3. As a result, the main encoding section 3 transitions to either of the original image mode and the dubbing mode, and performs encoding using main-encoding information according to the original image mode and the dubbing mode.

Upon receiving the input image 91 that has undergone delay processing via the delay buffet 6, the main encoding section 3 generates difference image data between a predicted image and the input image by the intra-prediction processing section 31, by using the intra-prediction mode determined by the first pre-encoding section 1. The DCT section 32 performs a DCT process, and the quantization section 33 performs quantization of DCT coefficients. The output of the quantization section 33 is also transmitted to the inverse quantization section 37. The inverse quantization section 37 performs inverse quantization to reproduce the DCT coefficients. Then, the IDCT section 36 transforms the DCT coefficients into IDCT, reproduces an input image, and stores the input image into the buffer 35. In this way, after the DCT by the DCT section 32 and the quantization of DCT coefficients by the quantization section 33 as described above, entropy coding is performed by the entropy coding section 34, and the output stream 92 set to a target code size is outputted.

[2-3. Selection of Mode for Non-Original Image]

Next, an original image mode/dubbing mode determining process will be described. As described above, by the back search section 43, a detection quantization parameter QPe is detected from the MB to be processed. At this time, there are cases when even if the input image 91 is an original image, back search succeeds accidentally, and a detection quantization parameter QPe is detected. Conversely, there are cases when even if the input image 91 is a non-original image, back search accidentally fails, and a detection quantization parameter QPe is not detected.

Accordingly, the code size control section 4 determines whether the picture in the input image 91 being currently processed is an original image or a non-original image on the basis of whether the rate of success of back search is equal to or higher than a threshold.

Here, in the dubbing mode which is used as a rule when the picture is a non-original image, the detection quantization parameter QPe is used for each MB for which back search has succeeded, whereas the base quantization parameter $QP_{MB}$ and an offset based on activity are used for each MB for which back search has not succeeded. At this time, there are cases when, depending on the combination of these, the back-search generated code size of a picture exceeds a target code size. For this reason, if it is determined that the picture is a non-original image, the code size control section 4 is configured to compute a back-search generated code size in the dubbing mode, and select the dubbing mode if the back-search generated code size falls within the target code size and select the original image mode if the back-search generated code size does not fall within the target code size.

Specifically, the code size control section 4 computes the sum of generated code sizes (GenBits_success) of MBs for which back search has succeeded (hereinafter, these will be referred to as successful MBs). For each successful MB, the detection quantization parameter QPe is used as it is without considering the activity. Thus, for successful MBs, the code size control section 4 computes the sum of generated code sizes (GenBits_success) by using the generated code size computed by the previous-mode-estimation pre-encoding section 40.

The code size control section 4 computes, with respect to MBs for which back search has not succeeded (hereinafter, these will be referred to as unsuccessful MBs), the sum of generated code sizes (GenBits_not_success) when the base quantization parameter $QP_{MB}$ is used. As described above, in the second pre-encoding section 2, the rate of variation (Diffratio) when the quantization parameter QP changes by "1", and the base quantization parameter $QP_{MB}$ are computed. The code size control section 4 multiples the sum of generated code sizes (GenBits_not_success) by the number of times equal to the difference value (Diff_QP) between the predicted quantization parameter QPe and the base quantization parameter $QP_{MB}$, thereby computing the generated code size (GenBits_not_success_rev) when the base quantization parameter $QP_{MB}$ is used for unsuccessful MBs. That is, when the base quantization parameter $QP_{MB}$ is larger than the predicted quantization parameter QPd, the generated code size is found as GenBits_not_success_rev=GenBits_not_success×
(1.0+DiffRatio)^Diff_QP, and when the base quantization parameter $QP_{MB}$ is smaller than the predicted quantization parameter QPd, the generated code size is found as GenBits_not_success_rev=GenBits_not_success×
(1.0−DiffRatio)^Diff_QP.

By summing the generated code size for successful MBs (GenBits_success) and the generated code size for unsuccessful MBs (GenBits_not_success_rev), the code size control section 4 computes the back-search generated code size (GenBits_rev) of a picture in the case when the dubbing mode is used, as in the following equation.

GenBits_rev_=GenBits_success_+GenBits_not_success_rev

Next, the code size control section 4 determines whether or not the back-search generated code size (GenBits_rev) of a picture falls within a target code size.

The code size control section 4 compares the back-search generated code size (GenBits_rev) of a picture with the target code size (TargerBit) in accordance with the following equation. It should be noted that α is an added code size that is determined by to what extent fluctuation in code size is permitted.

$$GenBits\_rev <= (TargetBits + \alpha)$$

The code size control section 4 selects the dubbing mode when the back-search generated code size (GenBits_rev) of a picture falls within the target code size.

On the other hand, when the back-search generated code size (GenBits_rev) of a picture does not fall within the target code size, since there is a possibility that the back-search generated code size does not fall within the target code size due to an error resulting from the computation of the generated code size for unsuccessful MBs (GenBits_not_success_rev) by calculation, the code size control section 4 examines this possibility. The code size control section 4 compares a pre-correction generated code size (GenBits) of a picture, which is obtained by summing the generated code size for successful MBs (GenBits_success) and the generated code size for unsuccessful MBs (GenBits_not_success) when the predicted quantization parameter QPd is used, with the target code size (TargetBit), in accordance with the following equation.

$$GenBits <= (TargetBits + \alpha)$$

If the pre-correction generated code size (GenBits) of a picture exceeds the target code size (TargetBit), since the generated code size exceeds the target code size (TargetBit) even in a state when there is no error due to the computation being done by calculation, the code size control section 4 selects the original image mode.

It should be noted that while the previous-mode-estimation pre-encoding section 40 uses the input image 91 as a predicted image in the intra-prediction processing section 41, when an image that has been encoded once is encoded with the same parameters, no distortion is introduced. Therefore, the input image 91 and the local decode image become the same, and no error is introduced to the code size. Therefore, when the rate of detection is high, an error resulting from the use of the input image 91 as a predicted image is so small as to be considered negligeable.

In this way, if a picture is a non-original image, the code size control section 4 predicts a back-search generated code size of the picture when the dubbing mode is used, and selects the dubbing mode if the generated code size of the picture falls within a target code size. On the other than, the code size control section 4 selects the original image mode if the generated code size of the picture does not fall within the target code size.

[2-4. Main Encoding]

At this time, in the original image mode, the intra-prediction processing section 31 of the main encoding section 3 uses the intra-prediction mode determined by the intra-prediction-mode determining section 11, with respect to the MB to be processed. In the dubbing mode, the intra-prediction processing section 31 changes the used intra-prediction mode for each MB to be processed. That is, if back search has succeeded in the MB to be processed, the intra-prediction processing section 31 uses the intra-prediction mode detected by the back search section 43. If back search has not succeeded in the MB to be processed, the intra-prediction processing section 31 uses the first ranked intra-prediction mode detected by the first pre-encoding section 1.

At this time, the quantization section 33 changes the used quantization parameter QP for each MB to be processed. That is, if back search has succeeded in the MB to be processed, the intra-prediction processing section 31 uses the detection quantization parameter QPe detected by the back search section 43 as it is. If back search has not succeeded in the MB to be processed, the intra-prediction processing section 31 uses the base quantization parameter $QP_{MB}$ determined in accordance with the results of the second pre-encoding section 2. It should be noted that the base quantization parameter $QP_{MB}$ is used as the average quantization parameter (QPBase), to which an offset according to the activity group determined by the first pre-encoding section 1 is added. The quantization section 33 uses, as the quantization matrix Q Matrix, the predicted quantization matrix Q MatrixD determined by the first pre-encoding section 1, irrespective of whether back search has succeeded or not.

In this way, on the basis of the original image mode/dubbing mode determination result, the image coding apparatus 200 transitions to the original image mode, and uses the base quantization parameter $QP_{MB}$ determined in accordance with the results of the second pre-encoding section 2, as the average quantization parameter (QPBase) for a picture. On the other hand, upon transitioning to the dubbing mode, the image coding apparatus 200 uses the detection quantization parameter QPe detected by the previous-mode-estimation pre-encoding section 40 as it is.

[2-5. Procedure]

Hereinbelow, referring to the flowchart in FIG. 7, a coding procedure RT10 by the image coding apparatus according to an embodiment of the present invention will be described in detail. A part or whole of this procedure also corresponds to an image coding method according to an embodiment.

Figure 3:
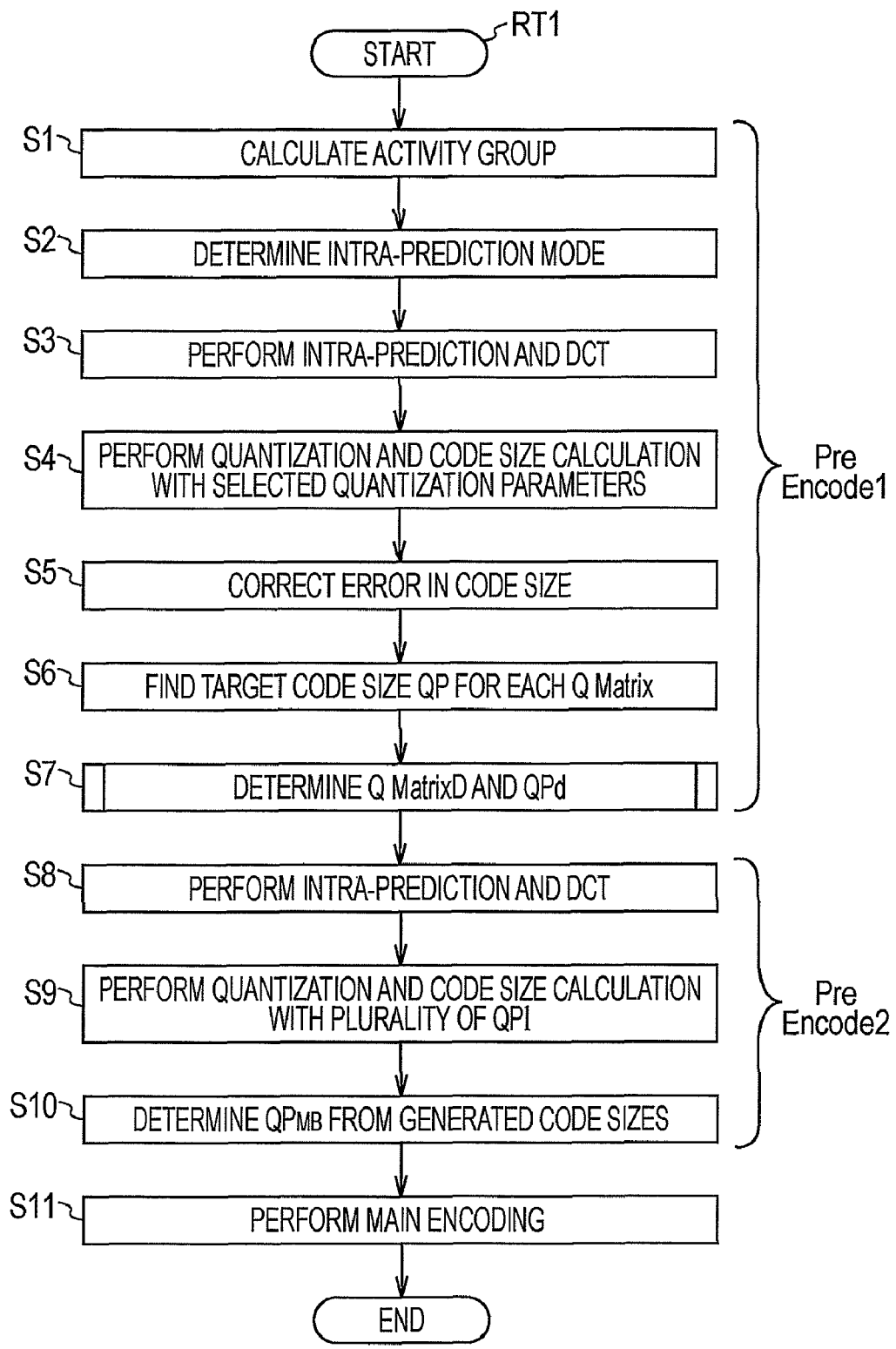
FIG. 3 is a flowchart illustrating in detail a procedure of coding by the image coding apparatus according to the first embodiment of the present invention.

It should be noted that since steps S1 to S10 are the same as those in FIG. 3, description is omitted.

The image processing apparatus 200 performs previous-mode-estimation pre-encoding by the previous-mode-estimation pre-encoding section 40 (steps S41 through S43). In this previous-mode-estimation pre-encoding, the previous-mode-estimation pre-encoding section 40 estimates the previous coding parameters (the quantization parameter QP and the intra-prediction mode), and acquires a back-search generated code size when coding with the estimated coding parameters.

The image coding apparatus 200 generates difference image data between a predicted image and the input image 91 by the intra-prediction processing section 41. At this time, the intra-prediction processing section 41 calculates difference image data with each of the first to M-th candidates determined by the intra-prediction mode determining section 11. Although processing is normally performed by using a local decode image in an intra-prediction process, here, the processing is performed by using the input image 91.

Next, the image coding apparatus 200 performs a DCT transform by the DCT section 42, and supplies the resulting output to the back search section 43 and the buffer 44 (step S41). Subsequently, the previous-mode-estimation pre-encoding section 40 transfers to a sub-routine SRT20, and performs a previous-parameter estimation process (step S42).

Subsequently, the image coding apparatus 200 performs quantization by the quantization section 45, and performs a code size calculation process by the entropy-code-length calculating section 46 (step S43).

That is, in accordance with the intra-prediction mode outputted from the back search section 43, the quantization section 45 selects data corresponding to the specified intra-prediction mode from the data stored in the buffer 44, and performs quantization. At this time, the quantization section 45 performs quantization on the basis of the detection quantization parameter QPe outputted from the back search section 43. Thereafter, the image coding apparatus 200 calculates a generated code size for each MB by the entropy-code-length calculating section 46. The entropy-code-length calculation is performed in the same scheme (CABAC/CAVLC) as entropy coding in the main encoding. Then, the code size control section 4 estimates the back-search generated code size of a picture when the dubbing mode is used, in accordance with the success/non-success of back search.

Next, the image coding apparatus 200 performs an encoding mode (original image mode/dubbing mode) determination (step S44).

The image coding apparatus 200 performs main encoding by the main encoding section 3 (step S45). In this main encoding, encoding is performed while switching parameters used for the encoding depending on whether the encoding mode is the original image mode or the dubbing mode.

In this way, the image coding apparatus 200 ends the series of processes of the coding procedure RT10.

Hereinbelow, referring to the flowchart in FIG. 8, a description will be given of the previous mode estimation process executed in step S42 of the coding procedure RT10.

First, from the predicted quantization parameter QPd and the activity group of each MB computed as a result of the first pre-encoding, an initial quantization parameter QP that, serves as a starting point for estimation is set (step S101).

Subsequently, an estimation process for a detection quantization parameter QPe is performed (step S102). The estimation process for a detection quantization parameter QPe is performed with respect to a certain range of quantization parameters QP with reference to the value set in step S101. That is, the estimation process is performed with respect to a range of quantization parameters QP from the upper limit value (QP LowerQPRange) to the lower limit value (QP UpperQPRange), among quantization parameters QP between 0 to 51. It should be noted that this range is set to, for example, about "10".

In other words, by using the predicted quantization matrix Q MatrixD found by the first pre-encoding section 1, the previous-mode-estimation pre-encoding section 40 performs an estimation process with respect to a predetermined range of quantization parameters QP, with the predicted quantization parameter QPd computed on the basis of the results of the first pre-encoding section 1 serving as a starting point.

Then, the back search section 43 judges whether or not estimation of a detection quantization parameter QPe has succeeded (step S103), and if the estimation has not succeeded, outputs the predicted quantization parameter QPd and the first-candidate intra-prediction mode determined by the intra-prediction-mode determining section 11 (step S104). On the other hand, if the estimation has succeeded, the back search section 43 outputs the estimated detection quantization parameter QPe (step S105), and performs an intra-prediction mode estimation process (step S106).

This intra-prediction mode estimation process is performed with respect to the first candidate to the M-th candidate. The back search section 43 judges whether or not the intra-prediction mode estimation has succeeded (step S107). The back search section 43 outputs the estimated intra-prediction mode if the estimation has succeeded (step S108), and outputs the first-candidate intra-prediction mode determined by the intra-prediction-mode determining section 11 if the estimation has not succeeded (step S109).

The back search section 43 judges whether or not processing has been performed on a number of blocks on which intra-prediction is to be performed (step S110), and if the processing has not been completed, returns to step S106 and repeats the above-mentioned processing. On the other hand, upon judging that the processing has been completed, the back search section 43 returns to step S42 (FIG. 7) of the coding procedure RT10.

Hereinbelow, referring to the flowchart in FIG. 9, a description will be given of the original image mode/dubbing mode determining process executed in step S44 of the coding procedure RT10.

Upon entering this process, first, the code size control section 4 performs determination of original image/non-original image (coded image) (step S111). That is, the code size control section 4 finds a rate of detection from the number of MBs for which the detection quantization parameter QPe has been detected in the estimation process for the quantization parameter QP used in the previous coding, and the total number of MBs, and determines an image to be a non-original image if this rate of detection is equal to or higher than a certain value.

Figure 7:
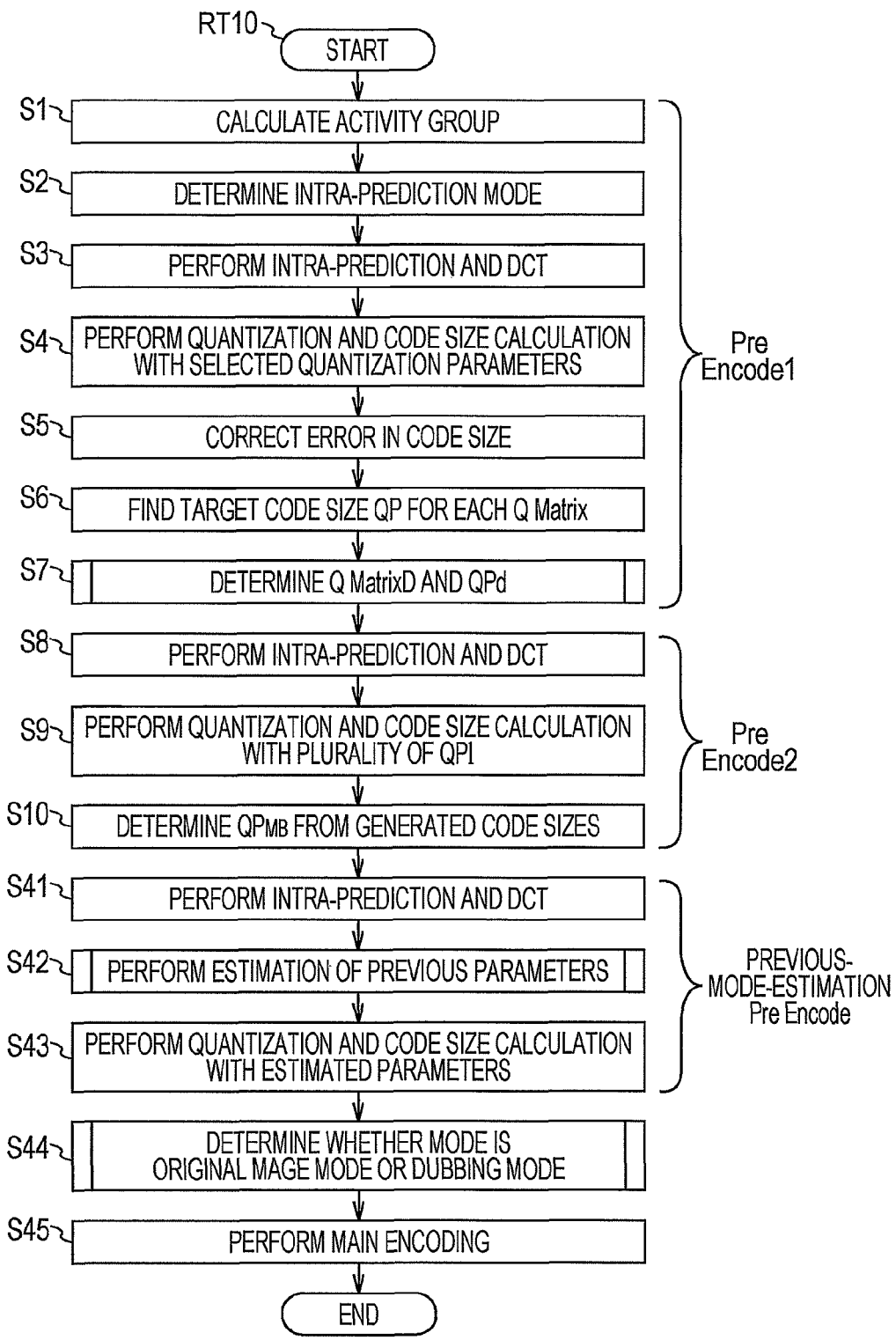
FIG. 7 is a flowchart illustrating in detail a procedure of coding by the image coding apparatus according to the second embodiment of the present invention.

Here, upon determining that the picture to be processed is an original image (step S112 is branched to Yes), the code size control section 4 determines the encoding mode to be the original image mode (step S117), and returns to step S44 of the coding procedure RT10 (FIG. 7).

On the other hand, upon determining that the picture to be processed is a non-original image (step S112 is branched to No), the code size control section 4 predicts a back-search generated code size when the picture to be processed is coded in the dubbing mode (step S113). Here, with respect to unsuccessful MBs, the code size control section 4 predicts the code size when the base quantization parameter $QP_{MB}$ found as a result of the second pre-encoding section 2 is used. If the bit rate (generated code size) condition is met (step S115 is branched to Yes), the code size control section 4 determines the encoding mode in the main encoding section 3 to be the dubbing mode (step S116). On the other hand, if the bit rate condition is not met, the code size control section 4 determines the encoding mode in the main encoding section 3 to be the original image mode (step S117), and returns to step S44 of the coding procedure RT10 (FIG. 7).

[2-6. Conclusion]

As described above, in the image coding apparatus 200, the processing by the previous-mode-estimation pre-encoding section 40 is executed in parallel with the pre-encode processing by the second pre-encoding section 2. In this way, the image coding apparatus 200 executes processing by the second pre-encoding section 2 and the previous-mode-estimation pre-encoding section 40 in parallel. It is possible for the image coding apparatus 200 to perform estimation of a detection quantization parameter QPe in the decreasing direction (increasing direction of the code size) from a predicted quantization parameter QPd determined in the first pre-encoding section 1, thereby making it possible to increase the rate of detection by estimation. That is, it is possible to deal with the change of the quantization parameter QP for MB due to the change of the activity group from the previous encoding, in a satisfactory manner.

In addition, by performing the processing by the second pre-encoding section 2 and the processing by the previous-mode-estimation pre-encoding section 40 in parallel, the image coding apparatus 200 can deal with cases where a back-search generated code size obtained as a result of back search does not meet a condition. As a result, in the image coding apparatus 200, the range of estimation for a detection quantization parameter QPe can be taken also in the direction in which the code size increases, thereby making it possible to enhance the rate of detection of the back search.

Further, the image coding apparatus 200 uses the input image 91 as a predicted image in the intra-prediction process in the previous-mode-estimation pre-encoding section 40, thereby simplifying configuration and also enhancing the rate of detection of the back search. In addition, the image coding apparatus 200 realizes calculation of a generated code size by adding only quantization and entropy-code-length calculation to the parameter estimation process, thereby making it possible to reduce the circuit scale.

[2-7. Operation and Effects]

According to the above configuration, the image coding apparatus 200 performs simple coding on the input image 91 by the first pre-encoding section 1 by at least quantizing the input image 91 on the basis of quantization parameters QP, thereby computing low-precision generated code sizes of the input image 91 upon simple coding. On the basis of the low-precision generated code sizes computed by the simple coding, the image coding apparatus 200 determines a quantization parameter QP with which the main-encoding generated code size upon coding the input image 91 by the main encoding section 3 is predicted to be closest to a target code size, as a base quantization parameter $QP_{MB}$. On the basis of remainders when dividing the input image 91 by rescaling factors RF based on the quantization parameters QP, the image coding apparatus 200 detects the quantization parameter QP used in the previous coding of the input image 91 is detected for each MB as a coding unit. The image coding apparatus 200 codes the input image 91 on the basis of the detection quantization parameter QPe detected, thereby computing a generated code size for each MB. The image coding apparatus 200 computes a generated code size for each picture as a control unit made up of a plurality of MBs, by summing a generated code size GenBits_not_success_rev based on the base quantization parameter $QP_{MB}$ with respect to each of MBs for which the detection quantization parameter QPe has not been detected, and a generated code size GenBits_success with respect to each of MBs for which the detection quantization parameter QPe has been detected.

Consequently, the image coding apparatus 200 can predict a generated code size GenBits_rev for each picture when main encoding is executed in accordance with the results of a back search process.

The image coding apparatus 200 computes a generated code size for each MB by causing the second pre-encoding section 2 and the previous-mode-estimation encoding section 40 to perform processing simultaneously in parallel.

Consequently, the image coding apparatus 200 can compute a generated code size based on the base quantization parameter $QP_{MB}$ even when the input image 91 is a non-original image. Thus, for each of MBs for which back search has not succeeded, the image coding apparatus 200 can use a generated code size based on the base quantization parameter $QP_{MB}$, thereby making it possible to predict a generated code size GenBits_rev for each picture in the dubbing mode.

On the basis of the rate of detection of the detection quantization parameter QPe, the image coding apparatus 200 determines whether or not the input image is an original image or a non-original image. If it is determined that the input image 91 is a non-original image, and the generated code size. GenBits_rev on a picture basis falls within a permitted value based on the target code size (TargetBits+α), the image coding apparatus 200 uses the detection quantization parameter QPe as the quantization parameter QP to be used in the main encoding (main-encoding quantization factor) with respect to each of MBs for which the detection quantization parameter QPe has not been detected, and uses the base quantization parameter $QP_{MB}$ as the quantization parameter QP to be used in the main encoding with respect to each of MBs for which the detection quantization parameter QPe has not been detected.

Consequently, when performing main encoding by using the detection quantization parameter QPe, the image coding apparatus 200 can keep the main-encoding generated code size within the target code size with reliability. It should be noted that to minimize degradation of image quality, the image coding apparatus 200 uses the dubbing mode even when the generated code size slightly exceeds the target code size, as long as it falls within the permitted value (TargetBits+α).

The image coding apparatus 200 uses the base quantization parameter $QP_{MB}$ as the quantization parameter QP to be used in the main encoding, if it is determined that the input image 91 is an original image. This permitted value (TargetBits+α) is a value obtained by adding an amount α of permitted fluctuation to the target code size TargetBits.

Consequently, the image coding apparatus 200 can perform main encoding on the original image by using the base quantization parameter $QP_{MB}$, thereby making it possible to keep the main-encoding generated code size within the target code size.

The image coding apparatus 200 codes the input image 91 on the basis of the base quantization parameter $QP_{MB}$ or a predicted quantization parameter QPd predicted to be in the neighborhood thereof and quantization parameters QP in the neighborhood of the predicted quantization parameter QPd, thereby computing high-precision generated code sizes of the input image 91 upon coding. The image coding apparatus 200 computes a rate of variation DiffRatio in generated code size accompanying variation in quantization parameter QP, from high-precision generated code sizes when coding the input image 91 on the basis of the predicted quantization parameter QPd and the quantization parameters QP in the neighborhood of the predicted quantization parameter QPd. The image coding apparatus 200 multiplies a high-precision generated code size for each MB based on the predicted quantization parameter QPd, by a variation multiplier ((1.0+DiffRatio)) obtained by adding 1 to the rate of variation DiffRatio, for a number of times (Diff_QP) equal to a difference value of the base quantization parameter $QP_{MB}$ from the predicted quantization parameter QPd.

Consequently, the image coding apparatus 200 can compute high-precision generated code sizes based on a base quantization parameter $QP_{MB}$ on the basis of a predicted quantization parameter QPd and quantization parameters QP in the neighborhood of the predicted quantization parameter QPd, thereby making it possible to simplify the configuration.

According to the above configuration, the image coding apparatus 200 uses the generated code size when the detection quantization parameter QPe is used, with respect to each of MBs for which the detection quantization parameter QPe has been detected, and uses the generated code size when the base quantization parameter $QP_{MB}$ is used, with respect to each of MBs for which the detection quantization parameter QPe has not been detected, thereby computing a back-search generated code size for each picture in the dubbing mode.

Consequently, the image coding apparatus 200 can predict a back-search generated code size in the dubbing mode in advance.

3. Other Embodiments

It should be noted that the first and second embodiments described above are directed to the case in which 15 selected quantization parameters QPl are selected. The present invention is not limited to this, and there is no limitation on that number. In addition, the number of selected quantization parameters QPl may be changed or their selection interval may be changed in accordance with the quantization matrix Q Matrix. In addition, the interval of selected quantization parameters QPl can be arbitrarily changed.

In addition, the first and second embodiments described above are directed to the case in which the input image 91 is used as a predicted image in the first pre-encoding section 1. The present invention is not limited to this. A local decode image may be used as well.

Further, the first and second embodiments described above are directed to the case in which only CAVLC is executed as entropy coding in the first pre-encoding section. The present invention is not limited to this. Both CAVLC and CABAC may be executed.

Further, the first and second embodiments described above are directed to the case in which the predicted quantization parameter QPd is selected on the basis of low-precision generated code sizes, and further, the base quantization parameter $QP_{MB}$ is selected on the basis of the predicted quantization parameter QPd. The present invention is not limited to this. For example, the base quantization parameter $QP_{MB}$ may be directly selected on the basis of low-precision generated code sizes.

Further, the first and second embodiments described above are directed to the case in which the generated code size for each picture is kept within a target code size. The present invention is not limited to this. For example, a generated code size for each slice may be kept within a target code size.

Further, the first and second embodiments described above are directed to the case in which, as a code size control, the generated code size for each picture is kept within a target code size. The present invention is not limited to this. For example, the average generated code size for each plurality of pictures may be kept within a target code size.

Further, the first and second embodiments described above are directed to the case in which the selected quantization parameters QPl are selected from a range that can be taken by the quantization matrix Q Matrix. The present invention is not limited to this. The selected quantization parameters QPl may be selected indiscriminately irrespective of the quantization matrix Q Matrix.

Further, the first and second embodiments described above are directed to the case in which a predicted quantization matrix Q MatrixD is determined by performing coding by using quantization matrices Q Matrix in order from one with a lower slope. The present invention is not limited to this. For example, coding may be performed by using quantization matrices Q Matrix in order from one with a larger slope, and the predicted quantization matrix Q MatrixD may be selected after finishing all of the coding.

Further, the first and second embodiments described above are directed to the case in which as quantization parameters QP in the neighborhood of a predicted quantization parameter QPd in the second pre-encoding section 40, values preceding and following the predicted quantization parameter QPd are used. The present invention is not limited to this. For example, values separated by two skips may be used as the neighboring quantization parameters QP. The neighboring quantization parameters QP may be selected as appropriate in accordance with the change in the rate of variation according to the value of quantization parameter QP.

Further, the first and second embodiments described above are directed to the case in which, in the second pre-encoding section 2, on the basis of the rate of variation in high-precision generated code size for a predicted quantization parameter QPd and quantization parameters QP in the neighborhood of the predicted quantization parameter QPd, high-precision generated code sizes based on other quantization parameters QP are computed. The present invention is not limited to this. For example, high-precision generated code sizes may be computed by increasing the number of neighboring quantization parameters QP and performing coding successively.

Further, the first and second embodiments described above are directed to the case in which, in the second pre-encoding section, the local decode image of a predicted quantization parameter QPd is shared as quantization parameters QP in the neighborhood of the predicted quantization parameter QPd. The present invention is not limited to this. A local decode image may be generated for each of those.

Further, the first and second embodiments described above are directed to the case in which pieces of error information on each of the bit rate and the quantization parameter QP are provided, and an amount of error is selected from a piece of error information having the smaller value. The present invention is not limited to this. For example, an amount of error may be selected from error information corresponding to either of the bit rate or the quantization parameter QP, or an amount of error may be selected from a single piece of error information corresponding to both of the bit rate and the quantization parameter QP.

Further, the first and second embodiments described above are directed to the case in which low-precision generated code sizes corrected with respect to CAVLC are corrected to thereby compute low-precision generated code sizes with respect to CABAC. The present invention is not limited to this. Low-precision generated code sizes with respect to CABAC may be computed from pre-correction generated code sizes with respect to CAVLC.

Further, the second embodiment described above is directed to the case in which the quantization parameter QP is detected by back search for each MB as a coding unit. The present invention is not limited to this. The coding unit may be any unit on the basis of which the quantization parameter QP is set, and there is no limitation on its size.

Further, the second embodiment described above is directed to the case in which, in the dubbing mode, a generated code size based on the base quantization parameter $QP_{MB}$ is used for each of unsuccessful MBs. The present invention is not limited to this. By further adding activity, a generated code size according to an adaptive quantization parameter QPt may be used.

Further, the second embodiment described above is directed to the case in which priority is given to prevention of degradation of image quality so that a transition to the dubbing mode is made only when the back-search generated code size is equal to or less than a permitted value to which an amount of permitted fluctuation is added. The present invention is not limited to this. Priority may be given to control of the generated code size so that a transition to the dubbing mode is made when the back-search generated code size is equal to or less than a target code size.

Further, the first and second embodiments described above are directed to the case in which the present invention is applied to AVC. The present invention is not limited to this. The present invention can be applied to a variety of coding schemes that select a VLC table adaptively.

Further, the first embodiment described above is directed to the case in which the first pre-encoding section 1 serving as a selected-generated-code-size computing section, and the code size control section 4 serving as an error correcting section and an interpolated-generated-code-size computing section form the image coding apparatus 100 serving as an image processing apparatus. The present invention is not limited to this. A selected-generated-code-size computing section, an error correcting section, and an interpolated-generated-code-size computing section that are configured in various other ways may form the image processing apparatus according to the present invention.

Further, the second embodiment described above is directed to the case in which the first pre-encoding section 1 serving as a simple-generated-code-size computing section, the second pre-encoding section 2 and the code size control section 4 each serving as a base-quantization-factor determining section, the back search section 43 serving as a back search section, the quantization section 45 serving as a detection-generated-code-size computing section, and the code size control section 4 serving as a control-unit generated-code-size computing section form the image coding apparatus 200 serving as an image processing apparatus. The present invention is not limited to this. A simple-generated-code-size computing section, a base-quantization-factor determining section, a back search section, a detection-generated-code-size computing section, and a control-unit generated-code-size computing section that are configured in various other ways may form the image processing apparatus according to the present invention.

The invention claimed is:

1. An image processing apparatus comprising:
   a selected-generated-code-size computing section that codes an input image by at least quantizing simple coded data that is obtained by simple coding of the input image through simple processing, by using quantization steps based on selected quantization factors discretely selected from quantization factors, and computes generated code sizes of the input image upon coding;
   an error correcting section that corrects an error in the generated code sizes of the input image upon coding which occurs in accordance with the simple processing;
   an interpolated-generated-code-size computing section that computes generated code sizes when the input image is coded on the basis of quantization parameters other than the selected quantization parameters, by an interpolation process with respect to the generated code sizes when the input image is coded on the basis of the selected quantization factors; and
   a main coding section that codes the input image on the basis of a base quantization factor determined by a base-quantization-factor determining section and that executes intra-prediction using a local decoded image as a predicted image before quantization,
   wherein said selected-generated-code-size computing section performs simple coding on the input image by simple processing in comparison to the main coding section, and said selected-generated-code-size computing section computes the generated code sizes of the input image upon coding by executing intra-prediction using the input image as the predicted image before quantization, and corrects the generated code sizes for an error that occurs due to use of the input image as the predicted image.

2. The image processing apparatus according to claim 1, further comprising:
   a base-quantization-factor determining section that determines, as a base quantization factor, a quantization factor with which a generated code size when coding the input image is predicted to be closest to a target code size, on the basis of the generated code sizes computed by the selected-generated-code-size computing section and the interpolated-generated-code-size computing section; and
   a main coding section that codes the input image on the basis of the base quantization factor determined by the base-quantization-factor determining section.

3. The image processing apparatus according to claim 2, wherein the selected-generated-code-size computing section uses the selected quantization factors selected from within a range of quantization factors that can be taken by a quantization matrix used in quantization.

4. The image processing apparatus according to claim 3, further comprising:
   a predicted-quantization-factor selecting section that selects, as a predicted quantization factor, a quantization factor corresponding to a generated code size closest to the target code size, among the generated code sizes computed by the selected-generated-code-size computing section and the interpolated-generated-code-size computing section,
   wherein the base-quantization-factor determining section includes
      a neighboring-generated-code-size computing section that codes the input image on the basis of the predicted quantization factor selected by the predicted-quantization-factor selecting section and quantization factors in a neighborhood of the predicted quantization factor, and computes generated code sizes of the input image upon coding, and
      a selecting section that selects, as the base quantization factor, a quantization factor corresponding to a generated code size closest to the target code size, if a generated code size when coding the input image on the basis of one of the predicted quantization factor and the quantization factors in the neighborhood of the predicted quantization factor is closest to the target code size.

5. The image processing apparatus according to claim 4, wherein the selected-generated-code-size computing section computes generated code sizes of the input image upon coding by using quantization matrices in order from a quantization matrix of which the slope is small, and if the predicted quantization factor falls within a range that can be taken by a used quantization matrix, determines the used quantization matrix as a quantization matrix to be used by the main coding section.

6. The image processing apparatus according to claim 5, wherein:
   the neighboring-generated-code-size computing section sets quantization factors immediately preceding and immediately following the predicted quantization factor as the quantization factors in the neighborhood of the predicted quantization factor; and
   the selecting section selects a quantization factor corresponding to a generated code size closest to the target code size, as the base quantization factor from among the predicted quantization factor and the quantization factors in the neighborhood of the predicted quantization factor, if the target code size falls within a range of the generated code sizes when coding the input image on the basis of the predicted quantization factor and the quantization factors in the neighborhood of the predicted quantization factor.

7. The image processing apparatus according to claim 4, wherein:
   the base-quantization-factor determining section further includes a rate-of-variation computing section that computes a rate of variation in generated code size accompanying variation in quantization factor, from the generated code sizes when coding the input image on the basis of the predicted quantization factor and the quantization factors in the neighborhood of the predicted quantization factor, if the target code size does not fall within a range of the generated code sizes when coding the input image on the basis of the predicted quantization factor and the quantization factors in the neighborhood of the predicted quantization factor, and a varying-generated-code-size computing section that computes, from the rate of variation computed by the rate-of-variation computing section, generated code sizes when coding the input image on the basis of quantization factors other than the predicted quantization factor and the quantization factors in the neighborhood of the predicted quantization factor; and the selecting section selects, as the base quantization factor, a quantization factor corresponding to a generated code size closest to the target code size, among the generated code sizes computed by the varying-generated-code-size computing section.

8. The image processing apparatus according to claim 4, wherein:

the main coding section executes intra-prediction using a local decode image as a predicted image before quantization; and the base-quantization-factor determining section, the neighboring-generated-code-size computing section uses a local decode image based on the predicted quantization factor as a predicted image for each of the quantization factors in the neighborhood of the predicted quantization factor, when coding the input image on the basis of the predicted quantization factor selected by the predicted-quantization-factor selecting section and the quantization factors in the neighborhood of the predicted quantization factor.

9. The image processing apparatus according to claim 1, wherein the selected-generated-code-size computing section corrects the error that occurs due to use of the input image as the predicted image, by using error information that is modeled by statistics in advance.

10. The image processing apparatus according to claim 9, wherein the error information is defined as a function of the quantization factors and the generated code sizes of the input image upon coding.

11. The image processing apparatus according to claim 10, wherein the selected-generated-code-size computing section has pieces of error information each modeled with the quantization factors and the generated code sizes of the input image upon coding as indices, and determines a correction amount from a piece of error information indicating a smaller amount of error.

12. The image processing apparatus according to claim 1, wherein:

the main coding section executes variable length coding or arithmetic coding while switching between the variable length coding and the arithmetic coding in accordance with the input image, after quantization of the input image; and the selected-generated-code-size computing section executes the variable length coding after quantization of the simple coded data to compute generated code sizes of the input image upon the variable length coding, and when the main coding section executes the arithmetic coding on the input image, corrects the generated code sizes of the input image upon the variable length coding to compute generated code sizes of the input image upon the arithmetic coding.

13. An image processing method comprising:

a selected-generated-code-size computing step of coding an input image by at least quantizing simple coded data that is obtained by simple coding of the input image through simple processing, by using quantization steps based on selected quantization factors discretely selected from quantization factors, and computing generated code sizes of the input image upon coding;

an error correcting step of correcting an error in the generated code sizes of the input image upon coding which occurs in accordance with the simple processing;

an interpolated-generated-code-size computing step of computing generated code sizes when the input image is coded on the basis of quantization parameters other than the selected quantization parameters, by an interpolation process with respect to the generated code sizes when the input image is coded on the basis of the selected quantization factors; and a main coding step that codes the input image on the basis of a determined base quantization factor and that executes intra-prediction using a local decoded image as a predicted image before quantization, wherein said selected-generated-code-size computing step performs simple coding on the input image by simple processing in comparison to the main coding step, and said selected-generated-code-size computing step computes the generated code sizes of the input image upon coding by executing intra-prediction using the input image as the predicted image before quantization, and corrects the generated code sizes for an error that occurs due to use of the input image as the predicted image.

* * * * *